(12) United States Patent
Fukuhara et al.

(10) Patent No.: US 8,204,331 B2
(45) Date of Patent: Jun. 19, 2012

(54) INFORMATION PROCESSING APPARATUS AND METHOD TO REDUCE DELAY IN IMAGE DECODING

(75) Inventors: Takahiro Fukuhara, Kanagawa (JP); Katsutoshi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 1055 days.

(21) Appl. No.: 12/109,705

(22) Filed: Apr. 25, 2008

(65) Prior Publication Data

US 2008/0285865 A1 Nov. 20, 2008

(30) Foreign Application Priority Data

May 17, 2007 (JP) .................. 2007-131627

(51) Int. Cl.
*G06K 9/00* (2006.01)
(52) U.S. Cl. ..................... 382/260; 382/248
(58) Field of Classification Search .......... 382/260, 382/248
See application file for complete search history.

(56) References Cited

U.S. PATENT DOCUMENTS

| | | | | |
|---|---|---|---|---|
| 6,546,143 B1 * | 4/2003 | Taubman et al. | ............. | 382/240 |
| 6,665,444 B1 * | 12/2003 | Kajiwara | ............. | 382/240 |
| 6,904,177 B2 * | 6/2005 | Nakayama | ............. | 382/240 |
| 7,024,046 B2 * | 4/2006 | Dekel et al. | ............. | 382/240 |
| 7,031,536 B2 * | 4/2006 | Kajiwara | ............. | 382/240 |
| 7,072,517 B2 * | 7/2006 | Andrew | ............. | 382/233 |
| 7,454,074 B2 * | 11/2008 | Dekel et al. | ............. | 382/240 |
| 8,000,548 B2 * | 8/2011 | Fukuhara et al. | ............. | 382/248 |
| 8,031,960 B2 * | 10/2011 | Fukuhara et al. | ............. | 382/248 |
| 2007/0269122 A1 | 11/2007 | Fukuhara et al. | | |
| 2007/0286510 A1 | 12/2007 | Fukuhara | | |
| 2008/0013845 A1 | 1/2008 | Fukuhara et al. | | |
| 2008/0013846 A1 | 1/2008 | Fukuhara et al. | | |

FOREIGN PATENT DOCUMENTS

| | | |
|---|---|---|
| JP | 10-283342 | 10/1998 |
| JP | 2002-101310 | 4/2002 |
| JP | 2004-194224 | 7/2004 |

OTHER PUBLICATIONS

Wim Sweldens, "The Lifting Scheme: A Custom-Design Construction of Biorthogonal Wavelets", Applied and Computational Harmonic Analysis, vol. 3, No. 2, pp. 186-200, 1996.

Christos Chrysafis et al., "Line Based, Reduced Memory, Wavelet Image Compression", IEEE Transactions on Image Processing, vol. 9, No. 3, pp. 378-389, Mar. 2000.

U.S. Appl. No. 11/814,257, filed Jul. 18, 2007, Takahiro Fukuhara, et al.

* cited by examiner

*Primary Examiner* — Hadi Akhavannik
(74) *Attorney, Agent, or Firm* — Oblon, Spivak, McClelland, Maier & Neustadt, L.L.P.

(57) ABSTRACT

In an information processing apparatus, a synthesis filtering process is performed on image data which has been subjected to hierarchical executions of an analysis filtering process, each execution of the analysis filtering process having caused frequency components of the image data to be divided into high-frequency components and low-frequency components, the total hierarchical executions of the analysis filtering process having caused the image data to be divided into a plurality of frequency bands, the synthesis filtering process involving synthesizing frequency components of frequency bands in each division level by performing a lifting calculation. The execution of the synthesis filtering process is controlled for each lifting calculation such that the lifting calculations are performed in an order that allows image data to be produced part by part, each part including a plurality of lines.

11 Claims, 23 Drawing Sheets

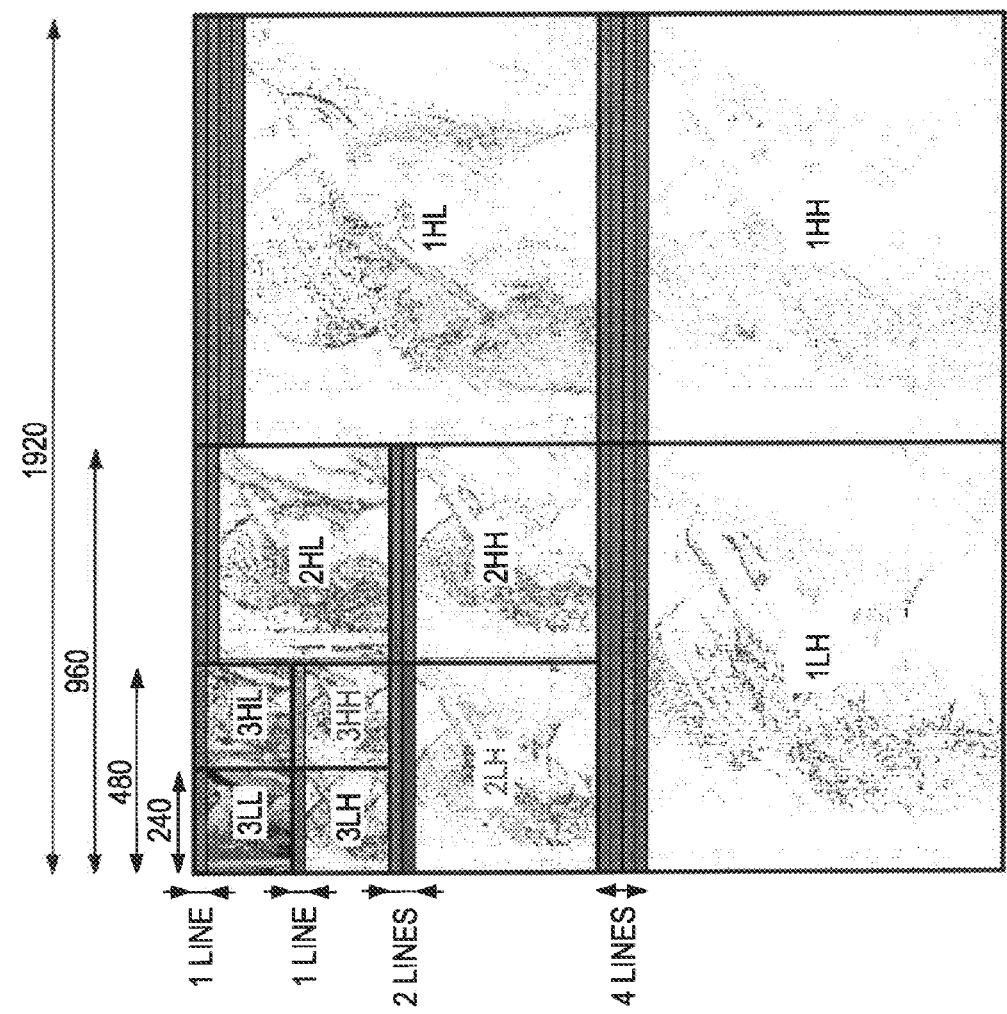

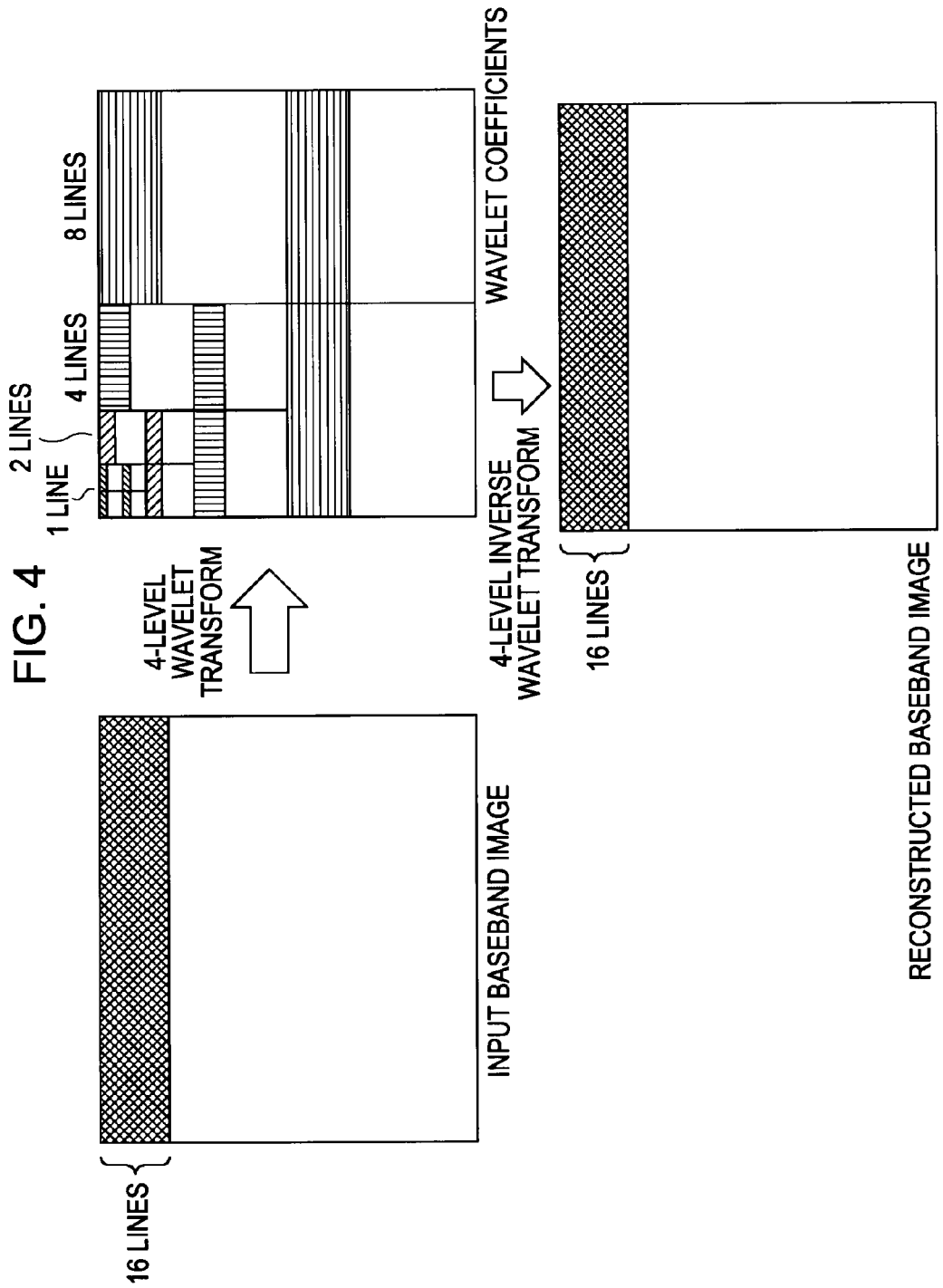

INFORMATION PROCESSING APPARATUS AND METHOD TO REDUCE DELAY IN IMAGE DECODING

CROSS REFERENCES TO RELATED APPLICATIONS

The present invention contains subject matter related to Japanese Patent Application JP 2007-131627 filed in the Japanese Patent Office on May 17, 2007, the entire contents of which are incorporated herein by reference.

BACKGROUND OF THE INVENTION

1. Field of the Invention

The present invention relates to an information processing apparatus and an information processing method, and more particularly, to an information processing apparatus and an information processing method, capable of achieving a great reduction in a delay caused by a decoding process and an inverse wavelet transform process.

2. Description of the Related Art

A JPEG (Joint Photographic Experts Group) format and a JPEG2000 format are widely used image compression algorithms according to standards established by the ISO (International Standards Organization). In general, when a discrete cosine transform (DCT) is used in an algorithm and a relative large number of bits are assigned, the algorithm can provide good encoded images and good decoded images.

In recent years, research efforts have been made on methods of encoding an image using a filter bank, which is a combination of a high-pass filter and a low-pass filter, in such a manner that given image data is divided into a plurality of frequency bands and encoding is performed separately for each band. Among these methods, much attention has been given to a wavelet transform encoding method, because of its advantage that unlike the DCT method, no block distortion occurs. Thus, the wavelet transform encoding method is expected to replace the DCT method.

In JPEG2000 established as an international standard in January 2001, a combination of the wavelet transform and a high-efficient encoding algorithm (bit modeling in units of bit plane and arithmetic encoding) is used to achieve a great improvement in encoding efficiency compared with the JPEG method.

The wavelet transform basically includes a process of filtering given image data in both horizontal and vertical directions thereby hierarchically separating low-frequency components from other components (see, for example, Japanese Unexamined Patent Application Publication No. 10-283342).

The coefficient data (frequency components) obtained as a result of the wavelet transform process on the image data is transformed into original image data via an inverse wavelet transform process. In the inverse wavelet transform process, the image is reconstructed by performing a synthesis filtering process on the high-frequency components and low-frequency components over all division levels from the highest level to the lowest level.

Encoding systems using the wavelet transform and the inverse wavelet transform are usable in video conference systems, video game systems, or other various systems in which image data is transmitted. In such a system, at a transmitting end, image data is wavelet-transformed, and coefficient data obtained as a result of the wavelet transform is encoded. The resultant encoded data is transmitted to a receiving end. At the receiving end, the received encoded data is decoded into coefficient data, and the obtained coefficient data is inverse-wavelet-transformed into original image data. In general, the encoding/decoding is performed according to the procedure described above.

SUMMARY OF THE INVENTION

In the image transmission systems described above such as a video conference system or video game system, it is desirable to transmit image data without a significant delay.

In view of the above, it is desirable to reduce the delay time caused by the decoding process and the inverse wavelet transform process performed at the receiving end.

According to an embodiment, the present invention provides an information processing apparatus including synthesis filtering process means for performing a synthesis filtering process on image data, the image data having been subjected to hierarchical executions of an analysis filtering process, each execution of the analysis filtering process having caused frequency components of the image data to be divided into high-frequency components and low-frequency components, the total hierarchical executions of the analysis filtering process having caused the image data to be divided into a plurality of frequency bands, the synthesis filtering process involving synthesizing frequency components of frequency bands in each division level by performing a lifting calculation, and control means for controlling the execution of the synthesis filtering process performed by the synthesis filtering process means for each lifting calculation such that the lifting calculations are performed in an order that allows image data to be produced part by part, each part including a plurality of lines.

The control means may control the execution of the synthesis filtering process such that in the production of each part of the image data, only lifting calculations necessary to produce the part of image data are performed.

Each time the lifting calculation is performed, the control means may delete unnecessary frequency components, which will not be used in the following lifting calculations, from a storage unit for storing frequency components used in the synthesis filtering process.

The information processing apparatus may further include decoding means for decoding encoded data of each frequency component of the image data having been divided into the plurality of frequency bands via the hierarchical executions of the analysis filtering process, wherein the synthesis filtering process means may perform the synthesis filtering process on frequency components obtained from the encoded data via the decoding performed by the decoding means, and the control means may control the execution of the decoding process performed by the decoding means, the decoding process being divided into a plurality of processing steps, the control means controlling the execution of the decoding process for each processing step.

The control means may employ a process associated with each encoded data as the processing step, and may control the execution of the decoding process for each encoded data.

In the production of each part of the image data, the control means may control the decoding means so as to perform the decoding process for only encoded data necessary in producing the part of the image data, and the control means may control the synthesis filtering process means so as to perform only lifting calculations on the obtained frequency components necessary to produce the part of the image data.

The control means may control the decoding means such that the decoding process is performed for all encoded data belonging to a particular set of encoded data, and, after completion of the decoding process for this particular set of encoded data, the control means may control the synthesis filtering process means such that the lifting calculation is performed for frequency components obtained as a result of the decoding process.

According to an embodiment, the present invention provides an information processing method comprising the step of performing a synthesis filtering process on image data, the image data having been subjected to hierarchical executions of an analysis filtering process, each execution of the analysis filtering process having caused frequency components of the image data to be divided into high-frequency components and low-frequency components, the total hierarchical executions of the analysis filtering process having caused the image data to be divided into a plurality of frequency bands, the synthesis filtering process involving synthesizing frequency components of frequency bands in each division level by performing a lifting calculation, the execution of the synthesis filtering process being controlled for each lifting calculation such that the lifting calculations are performed in an order that allows image data to be produced part by part, each part including a plurality of lines.

In the information processing apparatus/method, as described above, the synthesis filtering process is performed on image data which has been subjected to hierarchical executions of an analysis filtering process, each execution of the analysis filtering process having caused frequency components of the image data to be divided into high-frequency components and low-frequency components, the total hierarchical executions of the analysis filtering process having caused the image data to be divided into a plurality of frequency bands, the synthesis filtering process involving synthesizing frequency components of frequency bands in each division level by performing a lifting calculation, wherein the execution of the synthesis filtering process is controlled for each lifting calculation such that the lifting calculations are performed in an order that allows image data to be produced part by part, each part including a plurality of lines.

As described above, the present invention provides the great advantage that the delay time caused by the decoding process and the inverse wavelet transform process can be performed with the minimized delay time caused by the decoding process and the inverse wavelet transform process.

BRIEF DESCRIPTION OF THE DRAWINGS

FIG. 3 is a schematic diagram provided for an explanation of a wavelet transform;

FIG. 4 is a schematic diagram provided for an explanation of a wavelet transform;

DESCRIPTION OF THE PREFERRED EMBODIMENTS

Figure 1:
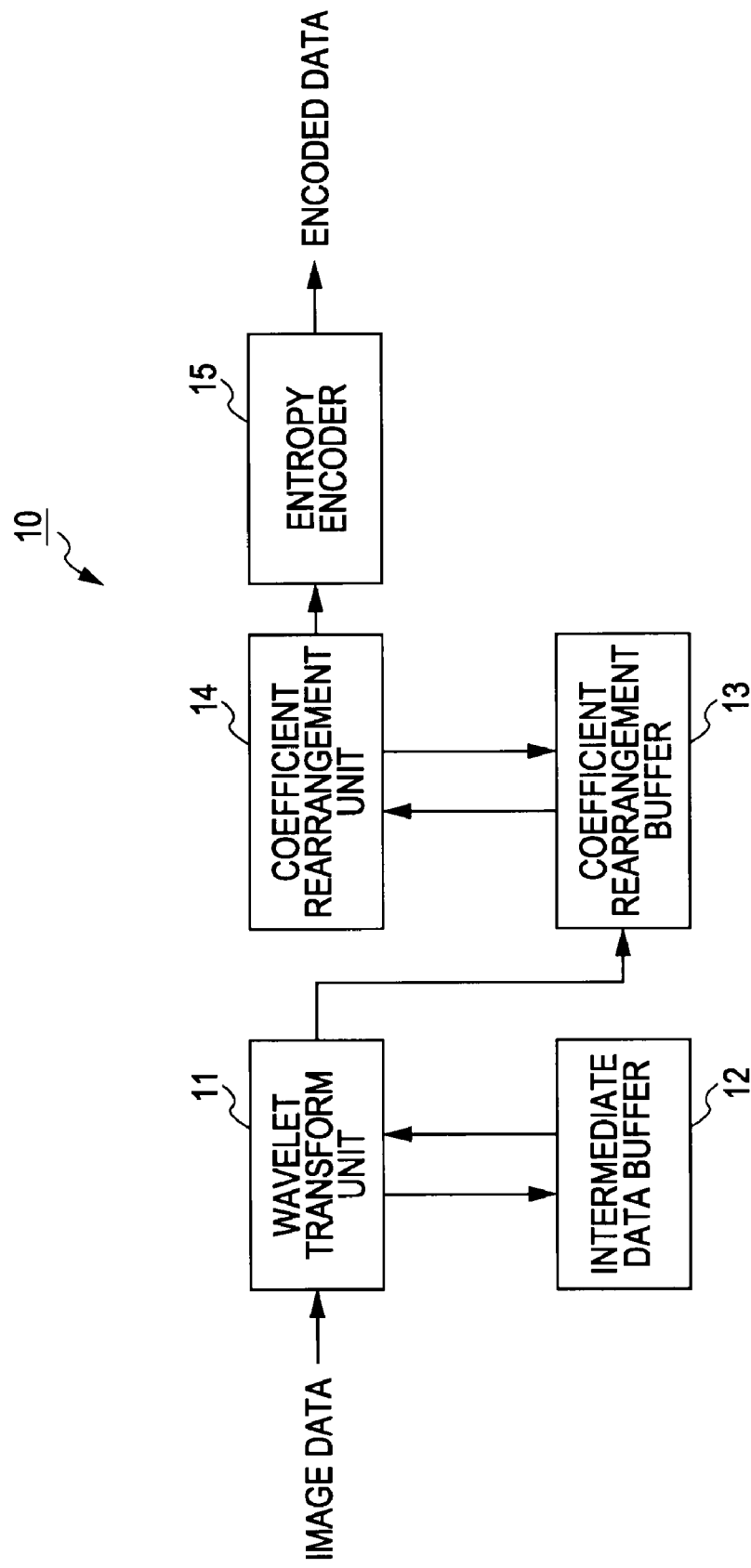
FIG. 1 is a diagram illustrating an example of a configuration of an encoder.

FIG. 1 is a functional block diagram schematically illustrating functions of a software encoder implemented by a software program to encode image data. That is, FIG. 1 illustrates an encoder 10 in the form of a software encoder which is implemented by executing a program by a CPU (Central Processing Unit) so as to realize functions of a wavelet transform unit 11, an intermediate data buffer 12, a coefficient rearrangement buffer 13, a coefficient rearrangement unit 14, and an entropy encoder 15.

If image data is input to the encoder 10, the input image data is supplied to the intermediate data buffer 12 via the wavelet transform unit 11 and is temporarily stored in the intermediate data buffer 12. The wavelet transform unit 11 performs a wavelet transform on the image data stored in the intermediate data buffer 12. More specifically, the wavelet transform unit 11 reads the image data from the intermediate data buffer 12 and performs a filtering process using an analysis filter on the read image data thereby producing data of coefficients of low-frequency components and high-frequency components. The produced coefficient data is stored in the intermediate data buffer 12. The wavelet transform unit 11 has a horizontal analysis filter and a vertical analysis filter thereby performing the analysis filtering process on the image data set in both horizontal and vertical directions of a frame. The wavelet transform unit 11 reads the coefficient data of the low-frequency components stored in the intermediate data buffer 12 and performs the filtering process using the analysis filter on the read coefficient data thereby further producing data of coefficients of high-frequency components and low-frequency components. The produced coefficient data is stored in the intermediate data buffer 12.

The wavelet transform unit 11 performs the above-described process repeatedly until a predetermined division level is achieved. If the predetermined division level is achieved, the wavelet transform unit 11 reads the coefficient data from the intermediate data buffer 12 and stores the coefficient data in the coefficient rearrangement buffer 13.

The coefficient rearrangement unit 14 reads the coefficient data from the coefficient rearrangement buffer 13 in a predetermined order and supplies the read coefficient data to the entropy encoder 15. The entropy encoder 15 quantizes the supplied coefficient data by a proper method and encodes the quantized coefficient data according to a proper entropy encoding method such as a Huffman encoding method or an arithmetic encoding method. The entropy encoder 15 outputs the resultant encoded data to the outside of the encoder 10.

Next, the process performed by the wavelet transform unit 11 shown in FIG. 1 is described in further detail below. First, the wavelet transform is explained briefly. In the wavelet transform on image data, as described schematically in FIG. 2, the process of dividing the image data into a high spatial frequency band and a low spatial frequency band is recursively executed on data of a low spatial frequency band obtained as a result of a previous execution of the process.

The analysis filter, includes a horizontal analysis filter adapted to perform the analysis filtering process on the image data in the horizontal direction of the frame and a vertical analysis filter adapted to perform the analysis filtering process in the vertical direction of the frame. Each time the image data is subjected to the analysis filtering process in both directions, the image data is decomposed into four sub-bands. The wavelet transform unit 11 recursively repeats (i.e., hierarchically repeats) the horizontal and vertical analysis filtering process on a band which is lowest of bands obtained as a result of the analysis filtering process in spatial frequency in both horizontal and vertical directions.

Figure 2:
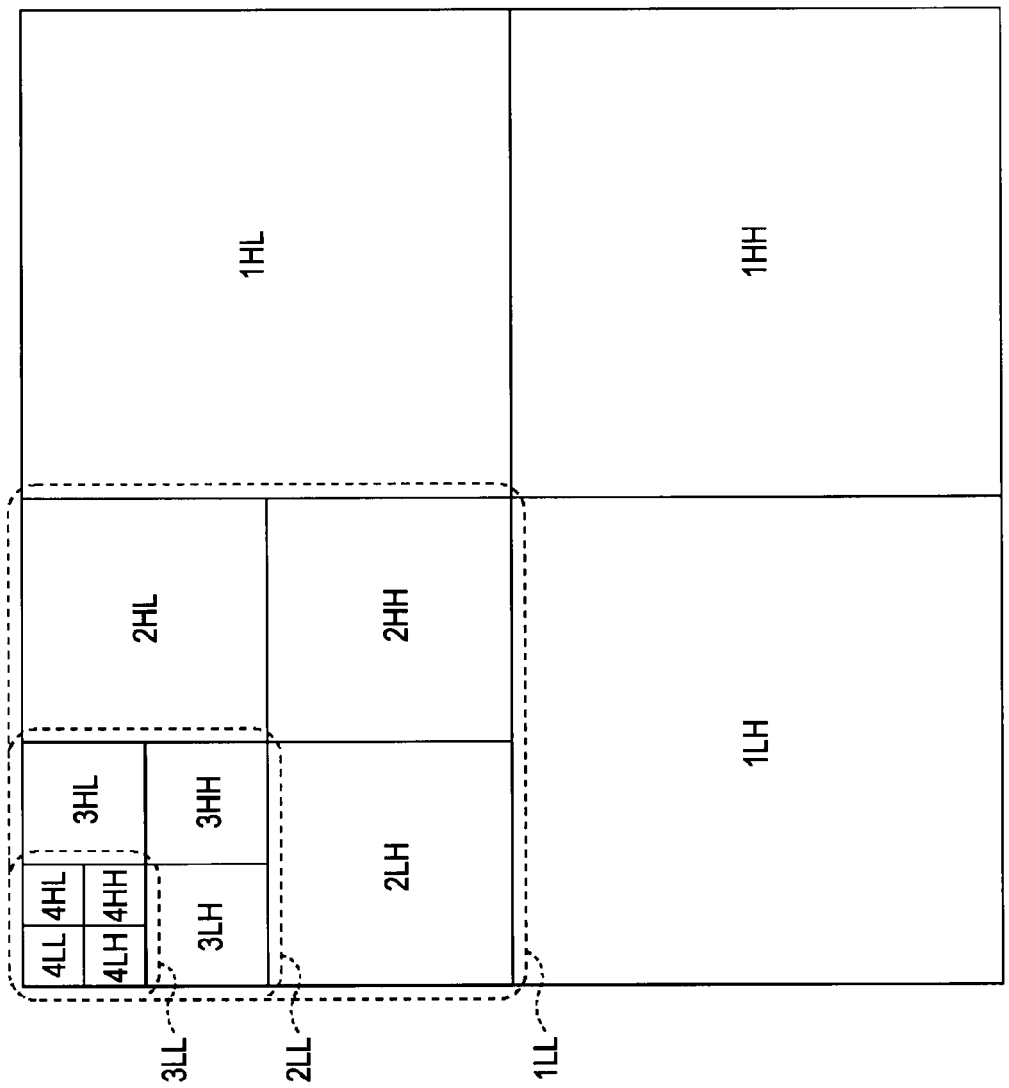
FIG. 2 is a schematic diagram provided for an explanation of a wavelet transform.

FIG. 2 is a diagram schematically illustrating an example of data obtained after the analysis filtering process is performed repeatedly 4 times. In the example shown in FIG. 2, as a result of the four recursive executions of the horizontal and vertical analysis filtering process, the frequency components of one frame of image data has been decomposed into 13 hierarchical sub-bands. The frequency component of data of each sub-band in this state, i.e., the frequency component of baseband image data is referred to as coefficient data.

In FIG. 2, each solid-line rectangle and each dashed-line rounded rectangle indicate a sub-band produced as a result of the analysis filtering process. A numerical prefix of each sub-band name indicates a hierarchical level of the sub-band. That is, each numerical prefix indicates the number of times the analysis filtering process has been performed on the baseband image data to obtain the sub-band. "L" or "H" in each sub-band name indicates whether the sub-band is of low or high frequency components, and "L" or "H" on the left-hand side of each sub-band name indicates that the sub-band is obtained as a result of the horizontal analysis filtering process while and "L" or "H" on the right-hand side indicates that the sub-band is obtained as a result of the vertical analysis filtering process.

In the example shown in FIG. 2, four sub-bands (1LL, 1LH, 1HL, and 1HH) of a first division level are produced as a result of a first execution of the analysis filtering process performed on baseband image data. Of the produced four sub-bands, a sub-band 1LL having lower frequency components in both horizontal and vertical directions is subjected to a second execution of the analysis filtering process. As a result, four sub-bands (2LL, 2LH, 2HL, and 2HH) of a second division level are obtained. A sub-band 2LL having lower frequency components in both horizontal and vertical directions among the four sub-bands (2LL, 2LH, 2HL, and 2HH) is subjected to a third execution of the analysis filtering process. As a result, four sub-bands (3LL, 3LH, 3HL, and 3HH) of a third division level are obtained. A sub-band 3LL having lower frequency components in both horizontal and vertical directions among the four sub-bands (2LL, 2LH, 2HL, and 2HH) is subjected to a fourth execution of the analysis filtering process. As a result, four sub-bands (4LL, 4LH, 4HL, and 4HH) of a fourth division level are obtained.

The reason why the transform and the decomposition are performed for a low spatial frequency band obtained as a result of a previous execution of the transform and the decomposition is that, as can be seen from FIG. 3, the higher the division level, the greater the image energy in the low-frequency band. By recursively performing the analysis filtering process thereby producing hierarchical sub-bands so that data in a low spatial frequency band is obtained in a smaller and smaller region, it becomes possible to achieve high efficiency in compression encoding using entropy encoding.

Hereinafter, a sub-band LL which has lowest frequency components in both horizontal and vertical directions among four sub-bands obtained as a result of a previous execution of the analysis filtering process and which is subjected to a next execution of the analysis filtering process will be referred to simply as a low sub-band, and other sub-bands LH, HL, and HH which are not subjected to further analysis filtering process will be referred to simply as high sub-bands.

In the method described above, the wavelet transform process is applied to an whole frame of a given image. Instead, one frame of image data may be divided into a plurality of parts each including a particular number of lines, and the wavelet transform process may be separately applied to each part of data. In the latter method, the size of image data separately subjected to the wavelet transform process is smaller than the data size subjected to the wavelet transform process according to the former method, and thus it is possible to start outputting a result of the wavelet transform process at an earlier timing than the former method. That is, it is possible to reduce the delay time caused by the wavelet transform process.

In this case, the number of lines included in each unit of data for which the wavelet transform process is performed is determined so that when the wavelet transform process is performed for data over a given division levels, one line of coefficient data of a sub-band can be finally obtained in the highest level.

Each time the analysis filtering process is performed, data is divided into four parts. Therefore, each time analysis filtering process is performed, the number of lines is reduced to one-half that of a previous level as shown in FIG. 3. That is, in the case of 3-division-level wavelet transform process as in the example shown in FIG. 3, 8 lines of baseband image data is needed to obtain one line of coefficient data of sub-bands (3LL, 3LH, 3HL, and 3HH) of the highest level. Therefore, in this case, the unit of baseband image data subjected to the wavelet transform process is determined so as to include at least 8 lines of base band image data. In the case of 4-division-level wavelet transform process as with the example shown in FIG. 2, at least 16 lines of baseband image data are needed.

A set of baseband pixel data necessary to finally obtain one line of coefficient data of a low sub-band LL of a highest level is referred to as a precinct (or a line block). Note that in some cases, the term "precinct" is used to describe a set of coefficient data of all sub-bands obtained via the wavelet transform from one precinct image data substantially equivalent to a set of baseband image data necessary to produce one line of coefficient data of a low sub-band LL of the highest level.

For example, as shown in FIG. 4, in a case where one precinct including 16 lines of baseband image data is subjected to a four-division-level wavelet transform process, coefficient data are produced in respective division levels as follows: 8 lines of coefficient data are produced in the first division level; 4 lines of coefficient data in the second division level; 2 lines of coefficient data in the third division level; and one line of coefficient data in the fourth division level.

The inverse wavelet transform process is a transform process inverse to the wavelet transform process described above. That is, the inverse wavelet transform process transforms the coefficient data obtained as a result of the wavelet transform process into original baseband image data. Therefore, in a case where the wavelet transform unit 11 performs the wavelet transform process in units of precincts in the above-described manner, the inverse wavelet transform process corresponding to the wavelet transform process is performed in the same units of precincts.

That is, as shown in FIG. 4, the coefficient data obtained as a result of the four recursive executions of the wavelet transform process from 16 lines of baseband image data is transformed into the original 16 lines of baseband image data via the four recursive executions of the inverse wavelet transform process.

The number of lines included in one precinct does not necessarily need to be equal for all precincts in one frame.

Figure 5A:
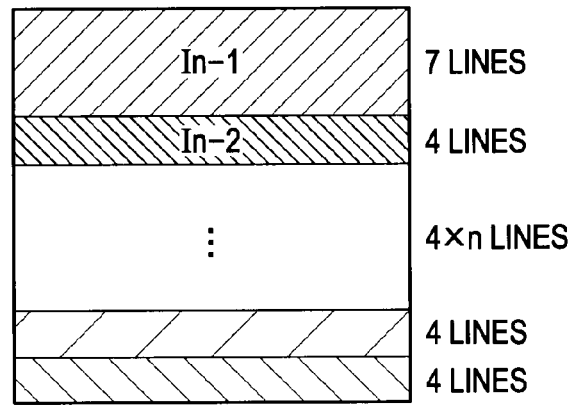
FIG. 5 is a schematic diagram provided for an explanation of a wavelet transform.
Figure 5B:
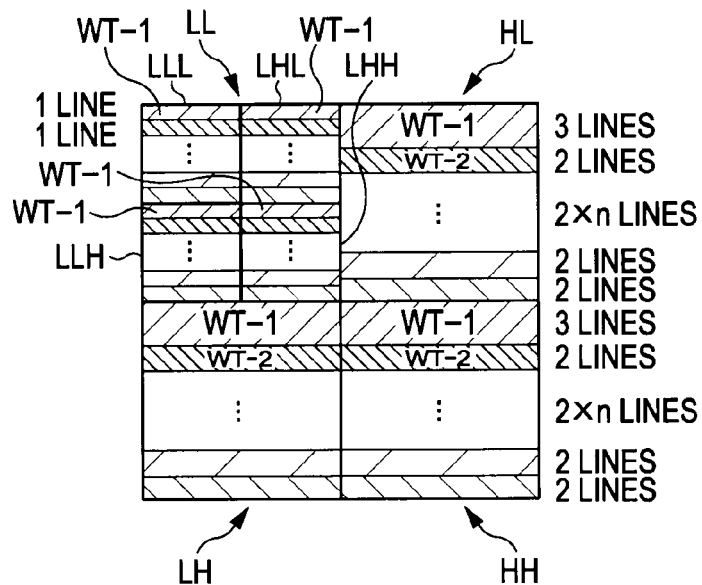
Figure 5C:
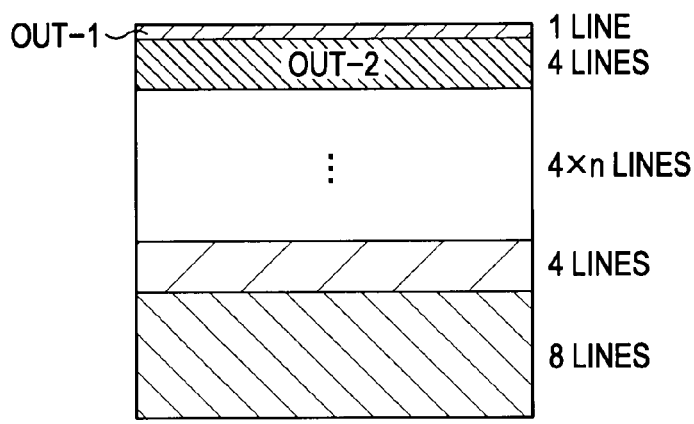

FIGS. 5A to 5C schematically illustrate an example of a manner in which two recursive executions of the wavelet transform process and the inverse wavelet transform process are performed. FIG. 5A illustrates one frame of baseband image data in a state before the wavelet transform process is performed, FIG. 5B illustrates an example of a set of coefficient data obtained when the one frame of baseband image data shown in FIG. 5A is subjected to a 2-division-level wavelet transform, and FIG. 5C illustrates baseband image data reconstructed from the coefficient data shown in FIG. 5B via a 3-division-level inverse wavelet transform.

In this specific example, as sown in FIG. 5A, only a precinct (In-1) located at the top of the frame include 7 lines, but the other precincts (In-2 etc.) each include 4 lines. Note that the numbers of lines of respective precincts are determined depending on a requirement in the algorithm of the analysis filtering process in the wavelet transform process. That is, in order to finally obtain one line of coefficient data in the highest division level, the precinct subjected to the first execution of the wavelet transform, i.e., the precinct located at the top of an image frame includes a greater number of lines of baseband image data than the other precincts.

As a result of the wavelet transform on the precinct In-1 (including 7 lines) shown in FIG. 5A, three lines of coefficient data (WT-1) are produced in each of four sub-bands (LL, HL, LH, and HH) in the first division level, a shown in FIG. 5B. If the resultant low-frequency sub-band LL is further subjected to the wavelet transform, one line of coefficient data is produced in each of fourth sub-bands (LLL, LHL, LLH, and LHH) in the second division level.

On the other hand, if a precinct In-2 (including 4 lines) which is the second precinct as counted from the top of FIG. 5A is subjected to the wavelet transform, two lines of coefficient data (WT-2) are produced in each of four sub-bands (LL, HL, LH, and HH) in the first division level, as shown in FIG. 5B. If the resultant low-frequency sub-band LL is further subjected to the wavelet transform, one line of coefficient data (WT-2) is produced in each of four sub-bands (LLL, LHL, LLH, and LHH) in the second division level. The third and following precincts in FIG. 5A are wavelet-transformed in a similar manner.

If the coefficient data of the precinct (WT-1) at the top of the frame shown in FIG. 5B is subjected to the inverse wavelet transform, one line of baseband image data (OUT-1) is produced as shown in FIG. 5C. If the inverse wavelet transform is performed on the precinct (WT-2) in the second position as counted from the top of the frame, four lines of baseband image data (OUT-2) are produced. The third and following precincts are inverse-wavelet-transformed in a similar manner. However, the inverse wavelet transform for the precinct located on the bottom of the frame creates 8 lines of baseband image data. Note that the numbers of lines produced in the respective levels are dependent on the algorithm of the synthesis filtering process.

As described above, a precinct located at the top or bottom of a frame may include a different number of lines from the other precincts, depending on the calculation algorithm.

The wavelet transform unit 11 performs the above-described process using a filter bank generally including a low-pass filter and a high-pass filter. Note that digital filters have a plurality of impulse response with different tap lengths, that is, a plurality of filter coefficients, and thus it is necessary to store as much input image data or coefficient data in a buffer memory as needed in the filtering process. In a case where the wavelet transform is performed over a plurality of stages, it is necessary to buffer as many wavelet transform coefficients produced in a previous stage as needed in the filtering process.

A method of the wavelet transform is explained detail below using a specific example in which a 5×3 filter is used. This method using the 5×3 filter is employed in the JPEG2000 standard, and is advantageous in that the wavelet transform can be performed using a small number of filter taps.

The impulse response (in z-transform expression) of the 5×3 filter can be given by a combination of responses of a low-pass filter $H_0(z)$ and a response of a high-pass filter $H_1(z)$ as described below in equations (1) and (2). As can be seen, $H_0(z)$ has five taps, while $H_1(z)$ has three taps.

$$H_0(z) = (-1 + 2z^{-1} + 6z^{-2} + 2z^{-3} - z^{-4})/8 \quad (1)$$

$$H_1(z) = (-1 + 2z^{-1} - z^{-2})/2 \quad (2)$$

Note that it is possible to directly calculate the coefficients of the low-frequency components and those of the high-frequency components according to equation (1) or (2). If a lifting technique is used, it is possible to reduce the calculation complexity in the filtering process.

Figure 6:
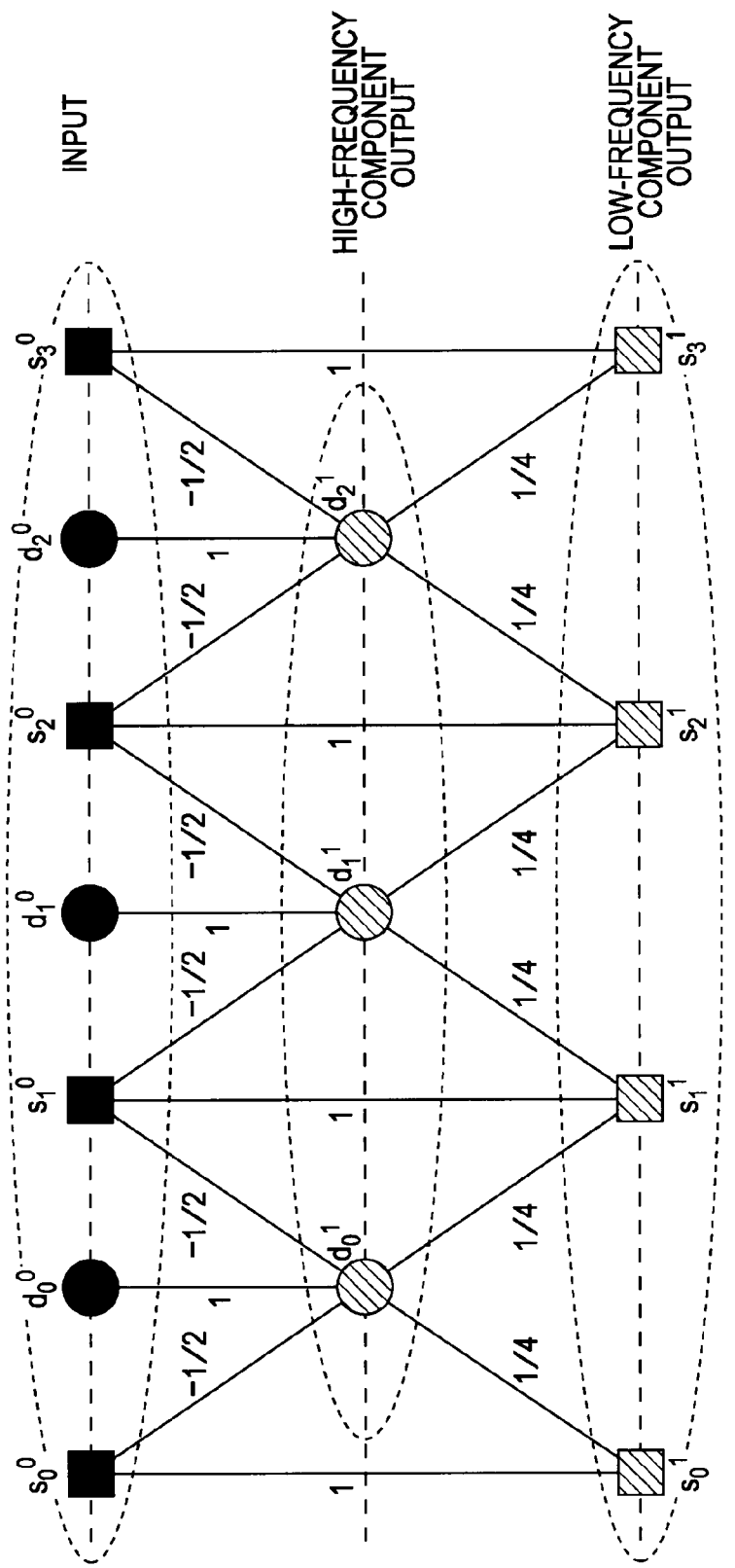
FIG. 6 is a diagram illustrating a lifting process performed in a 5×3 analysis filter.

Referring to FIG. 6, the filtering technique is explained below using an example in which a 5×3 filter is used.

In FIG. 6, a series of pixels of an input image is shown at the top of the figure, output high-frequency components are shown in the middle of the figure, and output low-frequency components are shown on the bottom of the figure. The input data at the top is not limited to a series of pixels of an input image but coefficients obtained as a result of the filtering process described above may be given as the input data. In the following explanation, it is assumed that a series of pixels of an image is given as input data, in which solid rectangles indicate even-numbered (starting from 0-th) pixels or lines, and solid circles indicate odd-numbered pixels of lines.

At a first stage of the process, coefficients $d_i^1$ of high-frequency components are produced from the series of input pixels according to equation (3) shown below.

$$d_i^1 = d_i^0 - \tfrac{1}{2}(s_i^0 + s_{i+1}^0) \quad (3)$$

At a second stage of the process, using the produced coefficients of the high-frequency components and also using odd-numbered of pixels of the input image, coefficients $s_i^1$ of low-frequency components are produced according to equation (4) shown below.

$$s_i^1 = s_i^0 + \tfrac{1}{4}(d_{i-1}^1 + d_i^1) \quad (4)$$

In the analysis filter, the pixel data of the input image is decomposed into low-frequency components and high-frequency components via the filtering process as described above.

Figure 7:
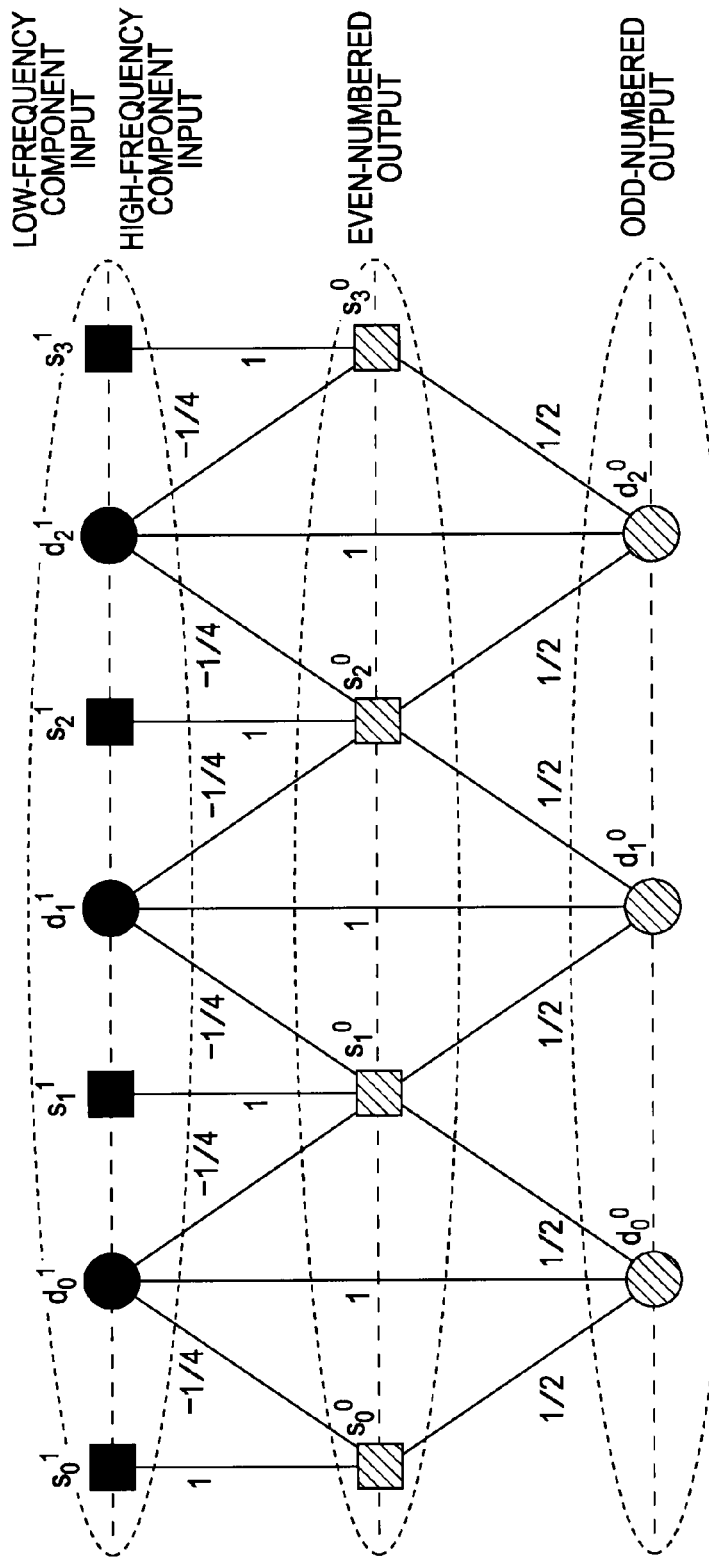
FIG. 7 is a diagram illustrating a lifting process performed in a 5×3 synthesis filter.

In the synthesis filter, the inverse wavelet transform is performed to reconstruct coefficients produced via the wavelet transform, as described below with reference to FIG. 7. FIG. 7 illustrates an example of the synthesis filtering process using a 5×3 filter and using the lifting technique. Note that this process corresponds to the process shown in FIG. 6. In FIG. 7, input coefficients produced via the wavelet transform are shown at the top of the figure, in which solid circles indicate coefficients of high-frequency components, while solid rectangles indicate coefficients of low-frequency components.

At a first stage of the process, from the input coefficients of the low-frequency components and those of the high-frequency components, even-numbered (starting from 0-th) coefficients $s_i^0$ are produced according to equation (5) shown below.

$$s_i^0 = s_i^1 - \tfrac{1}{4}(d_{i-1}^1 + d_i^1) \quad (5)$$

As a second stage of the process, odd-numbered coefficients $d_i^0$ are produced using the coefficients $s_i^0$ produced at the first stage and using the input coefficient $d_i^1$ of the high-frequency components according to equation (6) shown below.

$$d_i^0 = d_i^1 + \tfrac{1}{2}(s_i^0 + s_{i+1}^0) \quad (6)$$

In the synthesis filter, as described above, from the coefficients of the low-frequency components and the high-frequency components are synthesized via the inverse wavelet transform.

Figure 8:
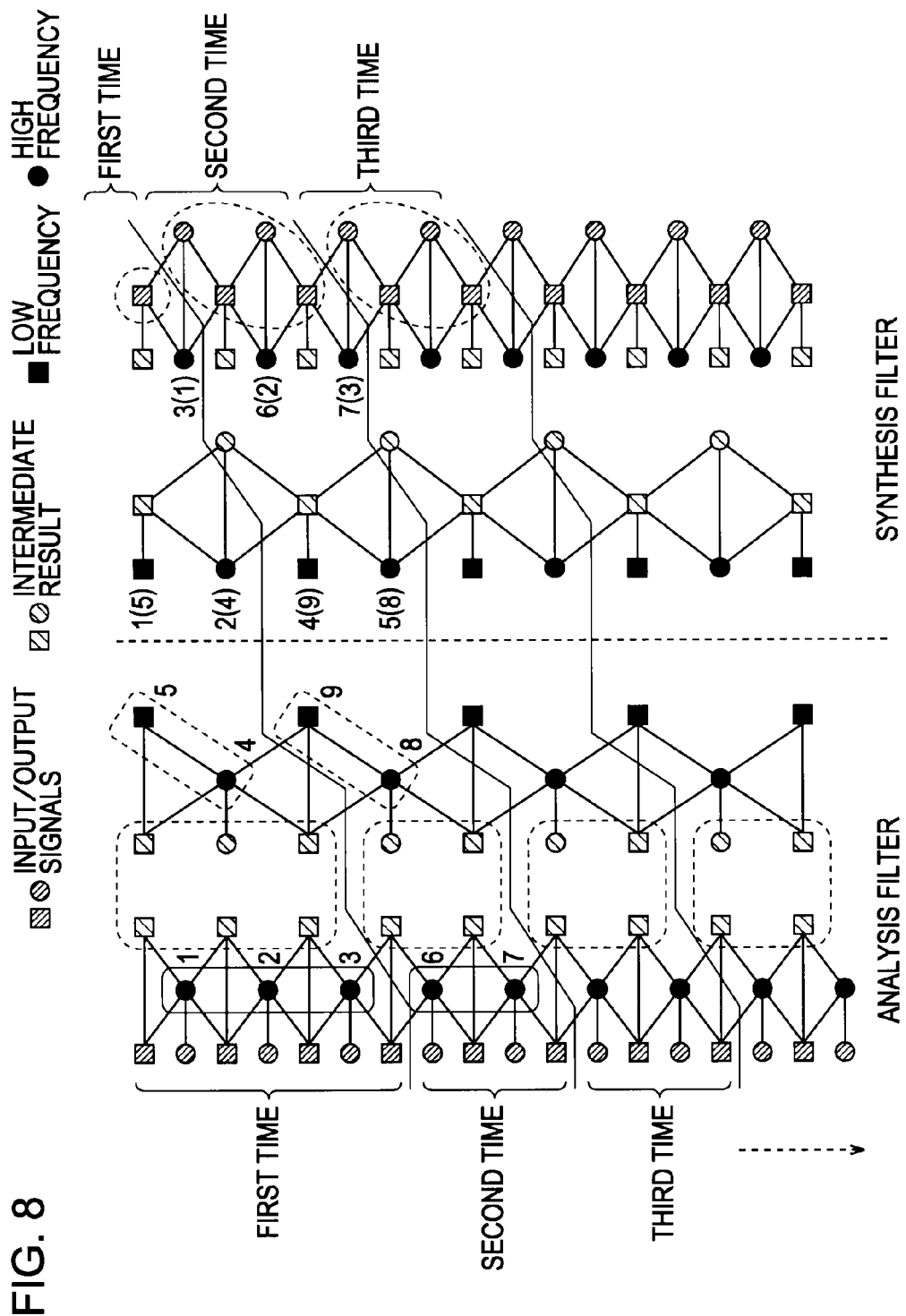
FIG. 8 is a diagram illustrating an example of a processing flow in an analysis filtering process and a synthesis filtering process.

FIG. 8 is a diagram schematically illustrating the analysis filtering process and the synthesis filtering process in a state in which the filtering using the lifting calculation using the 5×3 filter has been performed to the second division level. On the left-hand side of FIG. 8, the state of the lifting calculation in the analysis filtering process is shown, and the state of the lifting calculation in the synthesis filtering process is shown on the right-hand side of FIG. 8.

In FIG. 8, circles and rectangles both shaded with diagonal lines extending in a direction from upper left to lower right indicate frequency components of odd-numbered and even-numbered lines of baseband image data. Note that the line numbers are defined such that the line located at the top of the image is defined as a first line and the line number is incremented from the top to the bottom of the image.

Furthermore, in FIG. 8, circles and rectangles both shaded with diagonal lines extending in a direction from lower left to upper right indicate odd-numbered and even-numbered coefficients used in intermediate calculations of the lifting calculation of the synthesis filtering process or the synthesis filtering process. Furthermore, in FIG. 8, solid circles and solid rectangles respectively indicate high-frequency components and low-frequency components (frequency components) obtained as a result of the lifting calculation of the analysis filtering process. That is, on the left-hand side of FIG. 8, dashed-line rounded rectangles indicate the intermediate data buffer 12, and solid-line rounded rectangles indicates the coefficient rearrangement buffer 13.

In FIG. 8, first to third columns as counted from the left end indicate a manner in which the lifting calculation in the analysis filtering process is performed in the first division level, fourth to sixth columns indicate a manner in which the lifting calculation in the analysis filtering process is performed in the second division level, seventh to ninth columns indicate a manner in which the lifting calculation in the synthesis filtering process is performed in the second division level, and tenth to twelfth columns indicate a manner in which the lifting calculation in the synthesis filtering process is performed in the first division level.

Note that in FIG. 8, for simplicity, the analysis filtering process and the synthesis filtering process in the horizontal direction are not shown.

In FIG. 8, boundaries of the coefficients of respective precincts are represented by solid curves. That is, in a first precinct (treated in the first recursive execution of the process), 7 lines of image data are subjected to the analysis filtering process, and 5 lines of frequency components (3 lines of high-frequency components of the first division level, one line of high-frequency components of the second division level, and one line of low-frequency components of the second division level) are produced. In the synthesis filtering process, one line of image data is produced using 3 lines of frequency components (one line of high-frequency components of the second division level, one line of low-frequency components of the second division level, and one line of high-frequency components of the first division level) of the 5 lines.

The remaining 2 lines of high-frequency components of the first division level are used in the synthesis filtering process corresponding to the next precinct.

In the second precinct (treated in the second recursive execution of the process), 4 lines of image data are subjected to the analysis filtering process, and 4 lines of frequency components (2 lines of high-frequency components of the first division level, one line of high-frequency components of the second division level, and one line of low-frequency components of the first division level) are produced. In the synthesis filtering process, 4 lines of image data are produced using 2 lines of frequency components (one line of high-frequency components of the second division level and one line of low-frequency components of the first division level) of the produced lines of frequency components, and also using 2 lines of the high-frequency components of the first division level of the first precinct.

For the third precinct and further following precincts, the process is performed in a similar manner to the second precinct. In the last precinct, 8 lines of image data are produced via the synthesis filtering process.

As described above, as the process proceeds from left to right in FIG. 8, the analysis filtering process and the synthesis filtering process are performed as described above with reference to the examples shown in FIG. 5A to 5C.

On the left-hand side of FIG. 8, solid circles and rectangles are labeled with numerals to indicate producing order of frequency components obtained as a result of the analysis filtering process. On the right-hand side of FIG. 8, solid circles and rectangles are labeled with numerals to indicate the order in which frequency components are processed by the synthesis filtering process. Numerals enclosed within parentheses indicate the order in which the frequency components are produced via the analysis filtering process, that is, the numerals enclosed within parentheses on the right-hand side correspond to numerals on the left-hand side of FIG. 8.

As can be seen from the numerals, the frequency components are processed by the synthesis filtering process in a different order from the order in which the frequency components are produced by the analysis filtering process. More specifically, in the analysis filtering process for the second precinct, the frequency components are produced in the order 6→7→8→9. On the other hand, in the synthesis filtering process, the frequency components are used in the order 9→8→2→3. That is, in the analysis filtering process, the frequency components are produced in the order from high to low frequencies, while the frequency components are synthesized in the synthesis filtering process in the order from low to high frequencies. Therefore, before the synthesis filtering process is performed, it is necessary to change the order of the sequence of frequency components produced via the analysis filtering process.

Thus, the coefficient rearrangement unit 14 shown in FIG. 1 changes the order of the sequence by reading the coefficient data stored in the coefficient rearrangement buffer in the predetermined order.

Figure 9:
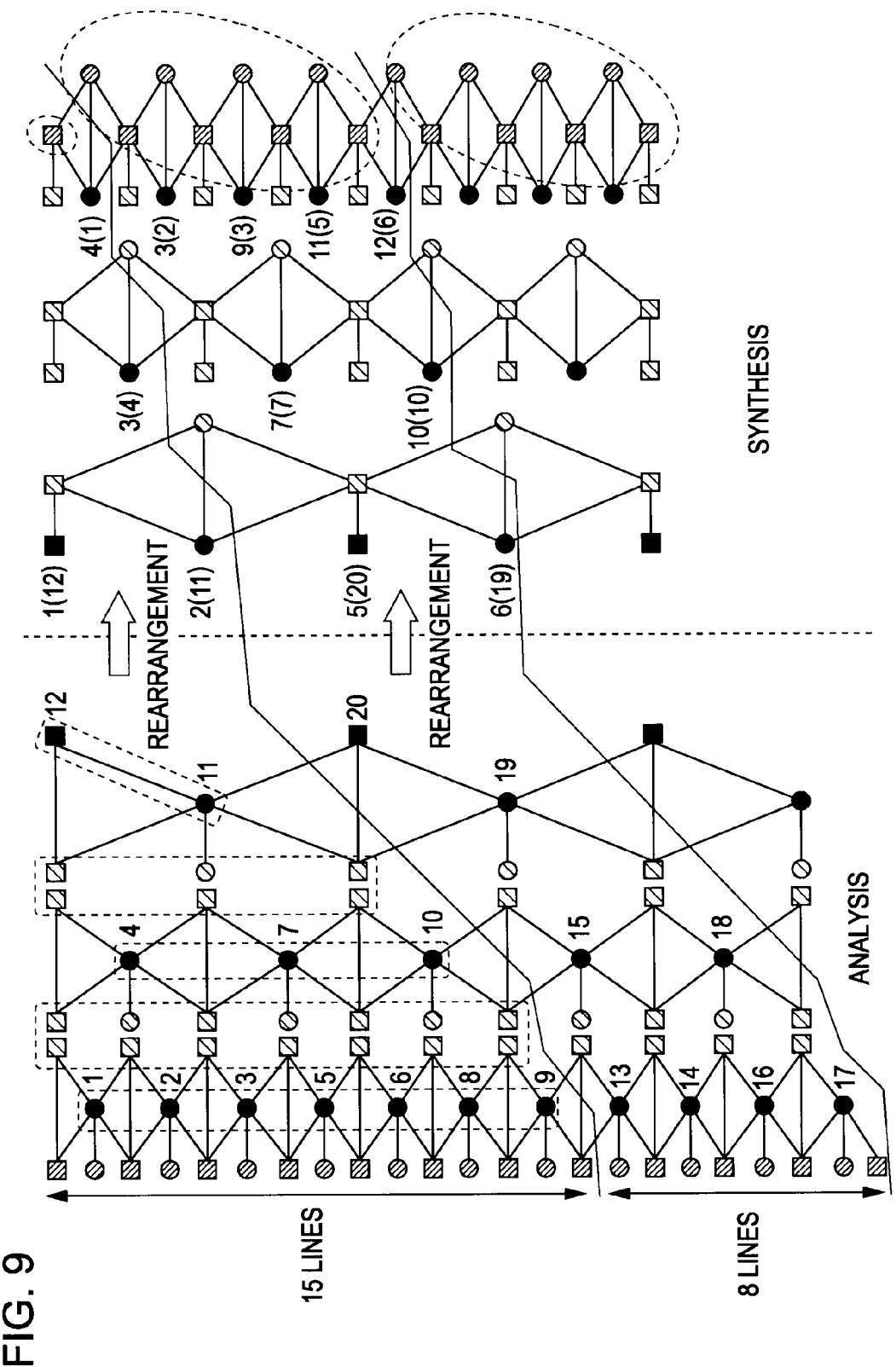
FIG. 9 is a diagram illustrating an example of a processing flow in an analysis filtering process and a synthesis filtering process.

FIG. 9 illustrates a manner in which the analysis filtering process of the division level of 3 is performed using a 5×3 filter. The basic operation is similar to the operation of the analysis filtering process of the division level of 2 described above with reference to FIG. 8. However, in the process shown in FIG. 9, the number of lines needed in the wavelet transform to obtain one line of frequency components of the low-frequency sub-band of the division level of 2 is 15 lines for the first precinct and 8 lines for the next and further following precincts. As for the synthesized data, one line is output for the first precinct, while 8 lines are output for the next and further following precincts.

In the process shown in FIG. 9, as with the process shown in FIG. 8, it is also needed to change the order of the sequence of frequency components after the analysis filtering process is performed. For example, in the case of the second precinct shown in FIG. 9, frequency components produced in the analysis filtering process in the order 2, 3, 5, 6, 7, 10, 19, 20 are processed in the synthesis filtering process in the order 20→19→7→2→3→10→5→6.

An example of a configuration of the decoder corresponding to the encoder 10 shown in FIG. 1 will be explained later. The encoder and the decoder may be implemented by hardware or software.

In the case where the encoder or the decoder is implemented by using a software program, the software program may be executed on a computer system.

Figure 10:
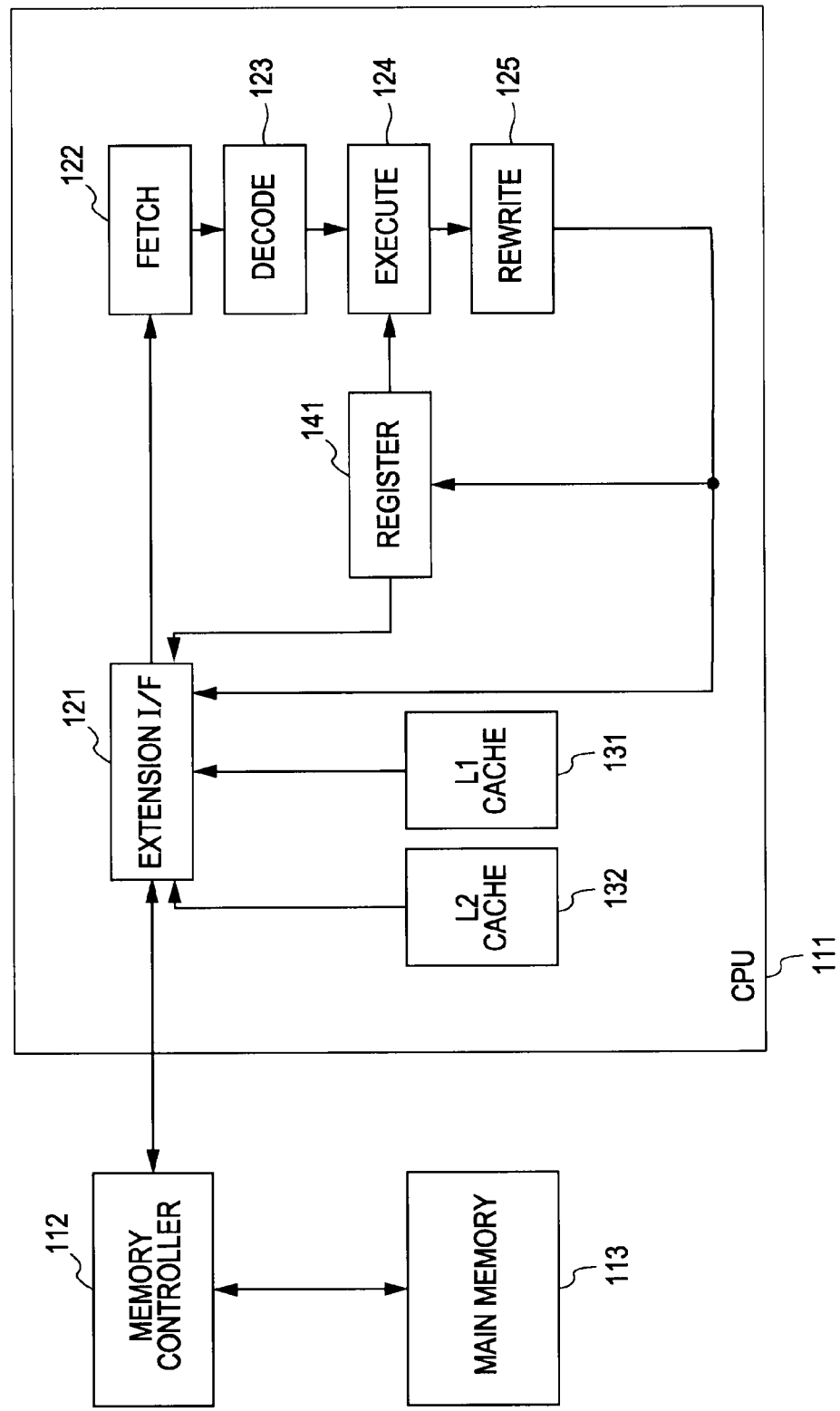
FIG. 10 is a block diagram illustrating an example of a general configuration of a part of a computer.

FIG. 10 is a block diagram illustrating an example of a general configuration of a part of a computer. In the configuration shown in FIG. 10, the computer 100 includes a CPU 111 adapted to perform various calculations and control various processes, a main memory 113 adapted to store various data and programs used or executed by the CPU 111 and store results of calculations performed by the CPU 111, and a memory controller 112 adapted to control accessing from the CPU 111 to the maim memory 113.

The CPU 111 includes an extension interface (I/F) module 121, a fetch module 122, a decoding module 123, an execution module 124, a rewriting module 125, and a register 141. In addition, the CPU 111 also includes a L1 cache (primary cache) 131 and a L2 cache (secondary cache) 132, which are internal memories for storing data used most frequently.

Because the L1 cache 131 and the L2 cache 132 are internal memories disposed in the CPU 111, they operate at a high frequency compared with the main memory 113 which is an external memory, and they are capable of being accessed directly not through a common bus, which allows high-speed inputting/outputting of data. However, the L1 cache 131 and the L2 cache 132 need higher production cost per bit than the main memory 113. Besides, an increase in the storage capacity of the L1 cache 131 and the L2 cache 132 results in an increase in total circuit complexity of the CPU 111, which leads to an increase in the production cost of the computer 100 and an increase in power consumption. Therefore, the L1 cache 131 and the L2 cache 132 have a less storage capacity than the main memory 113.

In other words, the main memory 113 has a larger storage capacity, needs lower power consumption in operation, and is lower in production cost, although the main memory 113 is low in data input/output speed compared with the L1 cache 131 or the L2 cache 132.

The software program for implementing the decoder or the encoder 10, which will be described later, is stored in the main memory 113 and read to the extension I/F module 121 in the CPU 111 via the memory controller 112. The software program is then supplied to (fetched by) the fetch module 122 via the extension I/F module 121. The software program fetched by the fetch module 122 is decoded by the decoding module 123 into a form executable by the CPU 111.

Data necessary in execution of the program is stored in the L1 cache 131 or the L2 cache 132, and data at a particular address is read via the register 141 in the execution of the program. The execution module 124 executes the program using the data read from the L1 cache 131 or the L2 cache 132.

The execution result is immediately rewritten by the rewriting module 125 into the L1 cache 131 or the L2 cache 132 via the extension I/F module 121. By executing the program by the execution module 124, for example, the entropy decoding process, the synthesis filtering process, and other processes are performed.

In an initial state, encoded data is stored in the L1 cache 131 or the L2 cache 132. In the middle of the entropy decoding process or the inverse wavelet transform process, the L1 cache 131 or the L2 cache 132 is rewritten by coefficient data and finally by baseband image data.

As described above, reading/writing of data is performed using high-speed memories, i.e., the L1 cache 131 and the L2 cache 132 disposed in the CPU 111, and thus it is possible to perform the decoding process and the inverse wavelet transform process at a high speed.

However, as described above, because the L1 cache 131 and the L2 cache 132 are low in storage capacity, if the amount of data rewritten in the entropy decoding process or the inverse wavelet transform process is too great, all data cannot be stored in the L1 cache 131 or the L2 cache 132. In such a case, an increase in delay time can occur due to an additional process of saving data into the main memory 113, or due to a miss hit to the L1 cache 131 or the L2 cache 132.

In image transmission systems using the wavelet transform and the inverse wavelet transform such as a video conference system or a video game system, it is desirable to transmit image data with a small delay.

To achieve a reduction in delay in the decoding process or the inverse wavelet transform process, it is desirable to reduce the amount of data stored in the L1 cache 131 and the L2 cache 132.

In addition to using of the L1 cache 131 and the L2 cache 132, it is also desirable to improve the efficiency of the decoding process and the inverse wavelet transform process.

A method of achieving a high efficiency in the decoding process and the inverse wavelet transform process is described below.

Figure 11:
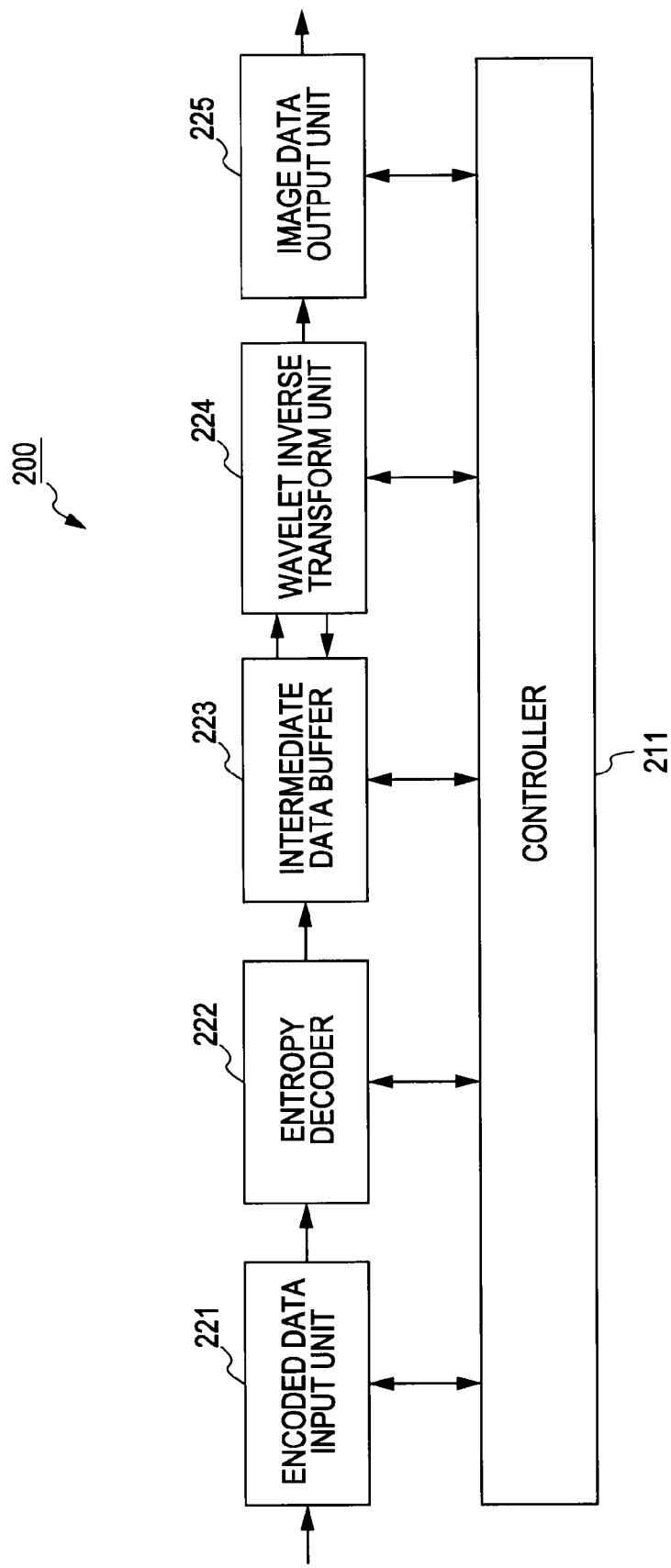
FIG. 11 is a block diagram illustrating an example of a configuration of a decoder according to an embodiment of the present invention.

FIG. 11 is a functional block diagram schematically illustrating functions of a software decoder implemented by a software program to decode encoded image data according to an embodiment of the present invention. In the following explanation, it is assumed that the software program is executed on the computer 100 configured in a generally employed manner shown in FIG. 10.

In FIG. 11, the decoder 200 is a software decoder, functions of a control unit 211, an encoded data input unit 221, an entropy decoder 222, an intermediate data buffer 223, an inverse wavelet transform unit 224, and an image data output unit 225 are realized by executing the program by the CPU 111.

The control unit 211 controls operations of various parts including the encoded data input unit 221 and the image data output unit 225, as will be described later. The encoded data input unit 221 performs a process to acquire encoded data supplied from an external device such as the encoder 10 located outside the decoder 200. The entropy decoder 222 performs an entropy decoding process on the encoded data supplied via the encoded data input unit 221 thereby to reproduce the coefficient data. The intermediate data buffer 223 stores the coefficient data, obtained from the encoded data via the decoding performed by the entropy decoder 222, in the L1 cache 131 or the L2 cache 132, and reads the coefficient data from the L1 cache 131 or the L2 cache 132 and supplies the read coefficient data to the inverse wavelet transform unit 224 in accordance with a request from the inverse wavelet transform unit 224. Furthermore, the intermediate data buffer 223 stores coefficient data, which is obtained in the synthesis filtering process performed by the inverse wavelet transform unit 224 and which is used in the intermediate calculation, in the L1 cache 131 or the L2 cache 132.

The inverse wavelet transform unit 224 acquires necessary coefficient data from the intermediate data buffer 223 and performs the inverse wavelet transform process (synthesis filtering process) on the acquired coefficient data. The inverse wavelet transform unit 224 recursively repeats the synthesis filtering process thereby to produce baseband image data. The image data output unit 225 outputs the baseband image data produced by the inverse wavelet transform unit 224 to the outside of the decoder 200.

An example of a control processing flow in the entropy decoding process and the inverse wavelet transform process, performed by the control unit 211 of the decoder 200 is described below with reference to a flow chart shown in FIG. 12. Note that this control process is performed on a frame-by-frame basis.

If the control process is started, first in step S101, the control unit 211 detects two lines of baseband image data located at the top of unprocessed lines and selects the detected two lines of baseband image data as data to be processed. In step S102, the control unit 211 determines coefficients of the highest division level of coefficients necessary in producing image data of interest.

In step S103, the control unit 211 controls the intermediate data buffer 223 and determines whether the coefficients determined in step S102 are stored in the L1 cache 131 or the L2 cache 132. If it is determined that the coefficients are not stored, the processing flow proceeds to step S104. In step S104, the control unit 211 determines encoded data corresponding to the coefficients determined in step S102. In step S105, the control unit 211 controls the encoded data input unit 221 so as to acquire one line of the encoded data. In step S106, the control unit 211 controls the entropy decoder 222 so as to execute the entropy decoding process on the acquired encoded data. In step S107, the control unit 211 controls the intermediate data buffer 223 so as to store the coefficients obtained as a result of the entropy decoding process into the L1 cache 131 or the L2 cache 132. If step S107 is completed, the control unit 211 returns the process to step S103.

On the other hand, in the case where the determination in step S103 is that the coefficients determined in step S102 are stored in the L1 cache 131 or the L2 cache 132, the control unit 211 advances the process to step S108.

In step S108, the control unit 211 controls the intermediate data buffer 223 so as to read the coefficients determined in step S102 from the L1 cache 131 or the L2 cache 132 and supplies the read coefficients to the inverse wavelet transform unit 224. In step S109, the control unit 211 controls the inverse wavelet transform unit 224 to perform the synthesis filtering process to produce 2 lines of coefficients of a division level lower by one, that is, the control unit 211 controls the inverse wavelet transform unit 224 to perform one execution of the lifting calculation.

If the synthesis filtering process on the coefficients determined in step S102 is completed, then, in step S110, the control unit 211 controls the intermediate data buffer 223 to delete unnecessary coefficients which will not be used in the synthesis filtering process from the coefficients stored in the L1 cache 131 or the L2 cache 132.

In step S111, the control unit 211 determines whether the coefficients obtained as a result of the synthesis filtering process in step S109 are of the lowest level, that is, of baseband image data. In a case where it is determined that the obtained result of the synthesis filtering process is not baseband image data, the control unit 211 returns the process to step S102 to repeat the process from step S102. That is, steps S102 to S111 are performed repeatedly, that is, the lifting calculation of the synthesis filtering process is recursively repeated until baseband image data is obtained.

In the case where the determination in step S111 is that baseband image data is obtained as a result of the synthesis filtering process, the control unit 211 advances the processing flow to step S112. In step S112, the control unit 211 controls the image data output unit 225 so as to output 2 lines of image data obtained via the synthesis filtering process.

In step S113, the control unit 211 determines whether image data has been output for all lines of a frame. If it is determined that image data has not been output for all lines, the processing flow returns to step S101 to repeat the process from step S101. That is, as described above with reference to step S101, the control unit 211 controls the entropy decoding process and the inverse wavelet transform process so as to output baseband image data part by part in units of 2 lines sequentially starting from the top of the frame of the image.

In the case where it is determined in step S113 that all lines have been output, the control unit 211 ends the control process.

Figure 13:
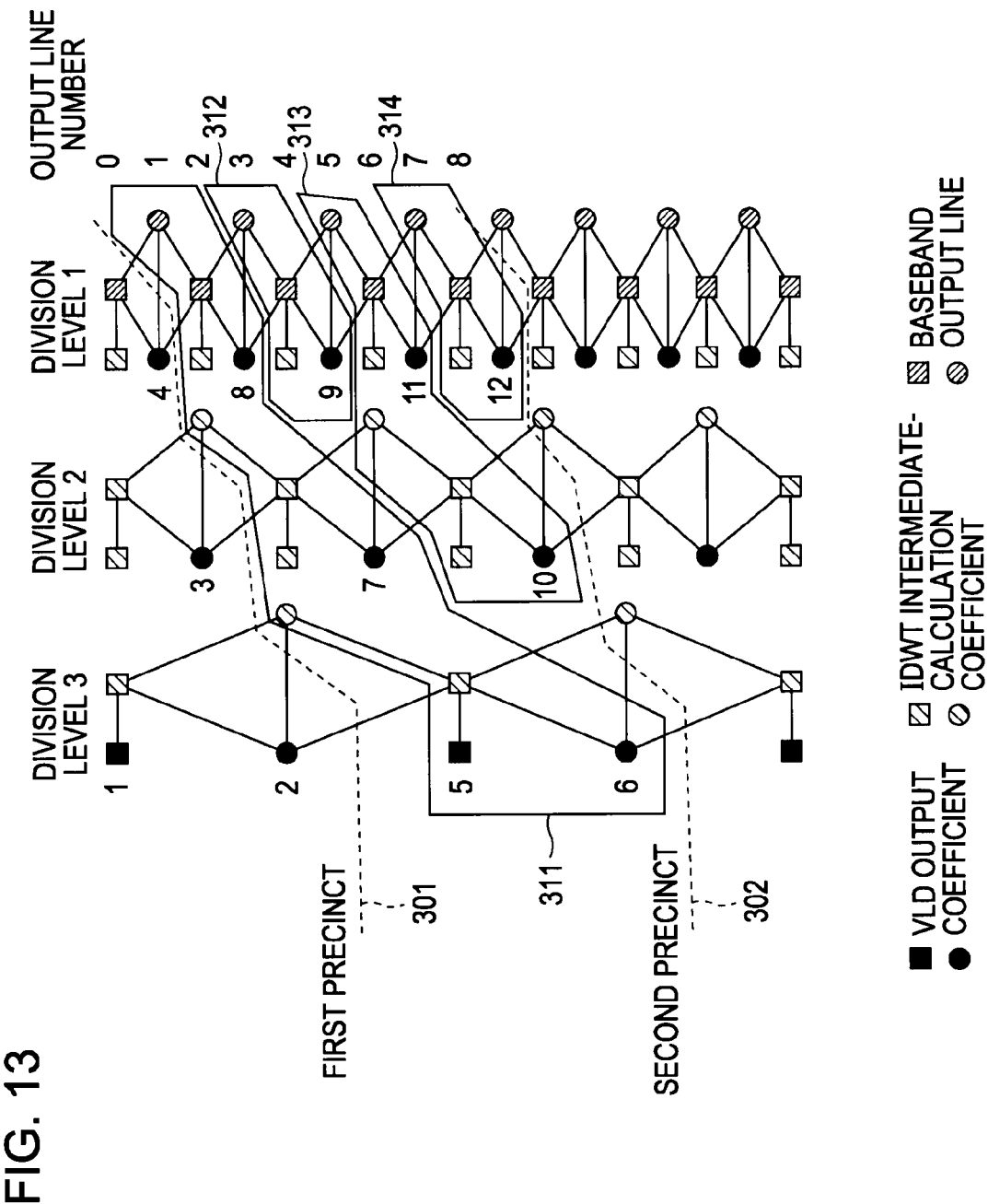
FIG. 13 is a diagram illustrating an example of a synthesis filtering process.

The synthesis filtering process is performed under the control of the control unit 211, for example, according to a procedure shown in FIG. 13. FIG. 13 schematically illustrates an example of the 3-division-level synthesis filtering process, which is basically similar to the process shown in FIG. 8 or 9. A dashed line 301 and a dashed line 302 indicate boundaries of precincts of coefficient data. In FIG. 13, solid circles and rectangles are labeled with numerals to indicate the order in which the decoding is performed by the entropy decoder 222 (that is, the order in which data is supplied from the encoder 10).

In the control process, the lifting calculation of the synthesis filtering process is performed on a region-by-region basis for regions each surrounded by a solid bold line in FIG. 13. For example, in the case of the second precinct between a dashed line 301 and a dashed line 302, the lifting calculation is performed first in a region 311, then in a region 312, further in a region 313, and finally in a region 314. In each region, the lifting calculation is performed in the order from the highest division level to the lowest division level.

More specifically, first, the inverse wavelet transform unit 224 performs the lifting calculation for the third division level (the first execution of the lifting calculation) using the coefficient decoded fifthly and the coefficient decoded sixthly in the region 311 and the coefficient decoded secondly (already obtained in the process for the first precinct). Next, using the coefficient decoded seventhly, the result of the first execution of the lifting calculation, and the coefficient decoded thirdly (already obtained in the process for the first precinct), the inverse wavelet transform unit 224 performs the lifting calculation for the second division level (the second execution of the lifting calculation). Next, using the coefficient decoded eighthly, the result of the second execution of the lifting calculation, and the coefficient decoded fourthly (already obtained in the process for the first precinct), the inverse wavelet transform unit 224 performs the lifting calculation for the first division level (the third execution of the lifting calculation). As a result, two lines (line 0 and line 1) of baseband image data are obtained.

Thus, the lifting calculation is completed for the region 311, and the inverse wavelet transform unit 224 performs the lifting calculation for the region 312.

For the region 312, first, the inverse wavelet transform unit 224 performs the lifting calculation for the first division level (the fourth execution of the lifting calculation) using the coefficients decoded eighthly and ninthly and the result of the second execution of the lifting calculation. As a result, two lines (line 2 and line 3) of baseband image data are obtained.

Thus, the lifting calculation is completed for the region 312, and the inverse wavelet transform unit 224 then performs the lifting calculation for the region 313.

For the region 313, first, the inverse wavelet transform unit 224 performs the lifting calculation for the second division level (the fifth execution of the lifting calculation) using the coefficients decoded seventhly and tenthly and the result of the first execution of the lifting calculation. Next, using the coefficients decoded ninthly and eleventhly and the result of the fifth execution of the lifting calculation, the inverse wavelet transform unit 224 performs the lifting calculation for the first division level (the sixth execution of the lifting calculation). As a result, two lines (line 4 and line 5) of baseband image data are obtained.

Thus, the lifting calculation is completed for the region 313, and the inverse wavelet transform unit 224 then performs the lifting calculation for the region 314.

For the region 314, first, the inverse wavelet transform unit 224 performs the lifting calculation for the first division level (the seventh execution of the lifting calculation) using the coefficients decoded eleventhly and twelfthly and the result of the fifth execution of the lifting calculation. As a result, two lines (line 6 and line 7) of baseband image data are obtained.

By performing the lifting calculation step by step such that two lines of baseband image data are produced and output at a time, the inverse wavelet transform unit 224 is capable of quickly producing and outputting baseband image data.

For example, if the lifting calculation in each precinct is performed in the order from the highest division level to the lowest division level, no baseband image data is output until all lifting calculations for the precinct are completed.

In contrast, in the present embodiment, the control unit 211 performs the control process in the above-described manner thereby making it possible for the inverse wavelet transform unit 224 to output baseband image data for line 0 and line 1 in the third execution of the lifting calculation. That is, the decoder 200 can output first baseband image data at an earlier stage of the process. Thus, the decoder 200 can reduce the delay time caused by the inverse wavelet transform process.

Figure 14:
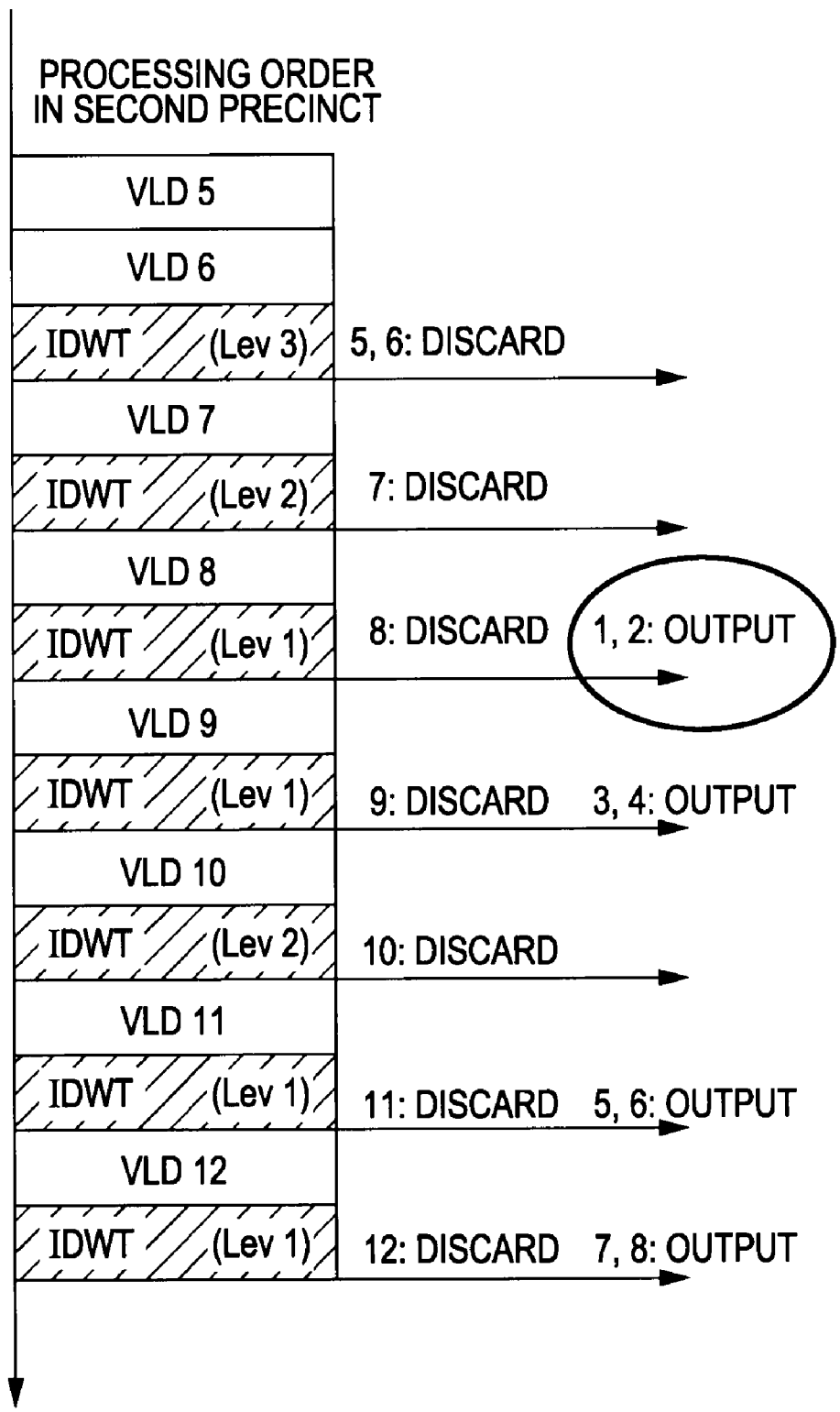
FIG. 14 is a schematic diagram illustrating an example of a processing flow in an entropy decoding process and an inverse wavelet transform process.

FIG. 14 is a diagram schematically illustrating a control processing flow in the entropy decoding process and the inverse wavelet transform process performed for the second precinct.

As shown in FIG. 14, first, the entropy decoder 222 decodes coefficient data (VLD 5) specified to be decoded fifthly and coefficient data (VLD 6) specified to be decoded sixthly, and the inverse wavelet transform unit 224 performs the first execution of the lifting calculation (IDWT (Lev 3)). Next, the entropy decoder 222 decodes coefficient data (VLD 7) specified to be decoded seventhly, and the inverse wavelet transform unit 224 performs the second execution of the lifting calculation (IDWT (Lev 2)). Next, the entropy decoder 222 decodes coefficient data (VLD 8) specified to be decoded eighthly, and the inverse wavelet transform unit 224 performs the third execution of the lifting calculation (IDWT (Lev 1)).

At this stage of the process, the inverse wavelet transform unit 224 is capable of outputting baseband image data for line 0 and line 1. That is, the decoder 200 is capable of advancing the timing of outputting first baseband image data compared with the case in which the wavelet transform process is performed after all encoded data in a precinct are decoded. That is, the decoder 200 can reduce the delay time caused by the inverse wavelet transform process.

Next, the entropy decoder 222 decodes coefficient data (VLD 9) specified to be decoded ninthly, and the inverse wavelet transform unit 224 performs the fourth execution of the lifting calculation (IDWT (Lev 1)). Next, the entropy decoder 222 decodes coefficient data (VLD 10) specified to be decoded tenthly, and the inverse wavelet transform unit 224 performs the fifth execution of the lifting calculation (IDWT (Lev 2)). Next, the entropy decoder 222 decodes coefficient data (VLD 11) specified to be decoded eleventhly, and the inverse wavelet transform unit 224 performs the sixth execution of the lifting calculation (IDWT (Lev 1)). Next, the entropy decoder 222 decodes coefficient data (VLD 12) specified to be decoded twelfthly, and the inverse wavelet transform unit 224 performs the seventh execution of the lifting calculation (IDWT (Lev 1)).

Each time the lifting calculation is performed, the control unit 211 controls the intermediate data buffer 223 to delete (discard) coefficients unnecessary in the following lifting calculation processes from the L1 cache 131 and the L2 cache 132. This makes it possible for the decoder 200 to reduce the amount of data stored in the L1 cache 131 and the L2 cache 132.

Note that the deleting (discarding) may be performed such that unnecessary data stored in the L1 cache 131 and the L2 cache 132 are actually deleted or simply set to be overwritable. Alternatively, unnecessary data may be managed separately. For example, the coefficient data decoded sixthly is not necessary in the lifting calculation for the second precinct after the first execution of the lifting calculation, but this coefficient data is used in the lifting calculation for the next precinct (the third precinct). In such a case, the intermediate data buffer 223 may store this sixthly decoded coefficient data in a storage area different from the storage area in which the other coefficient data are stored thereby removing this coefficient data from the group used in the process for the second precinct and thus in effect deleting the coefficient data.

Figure 15:
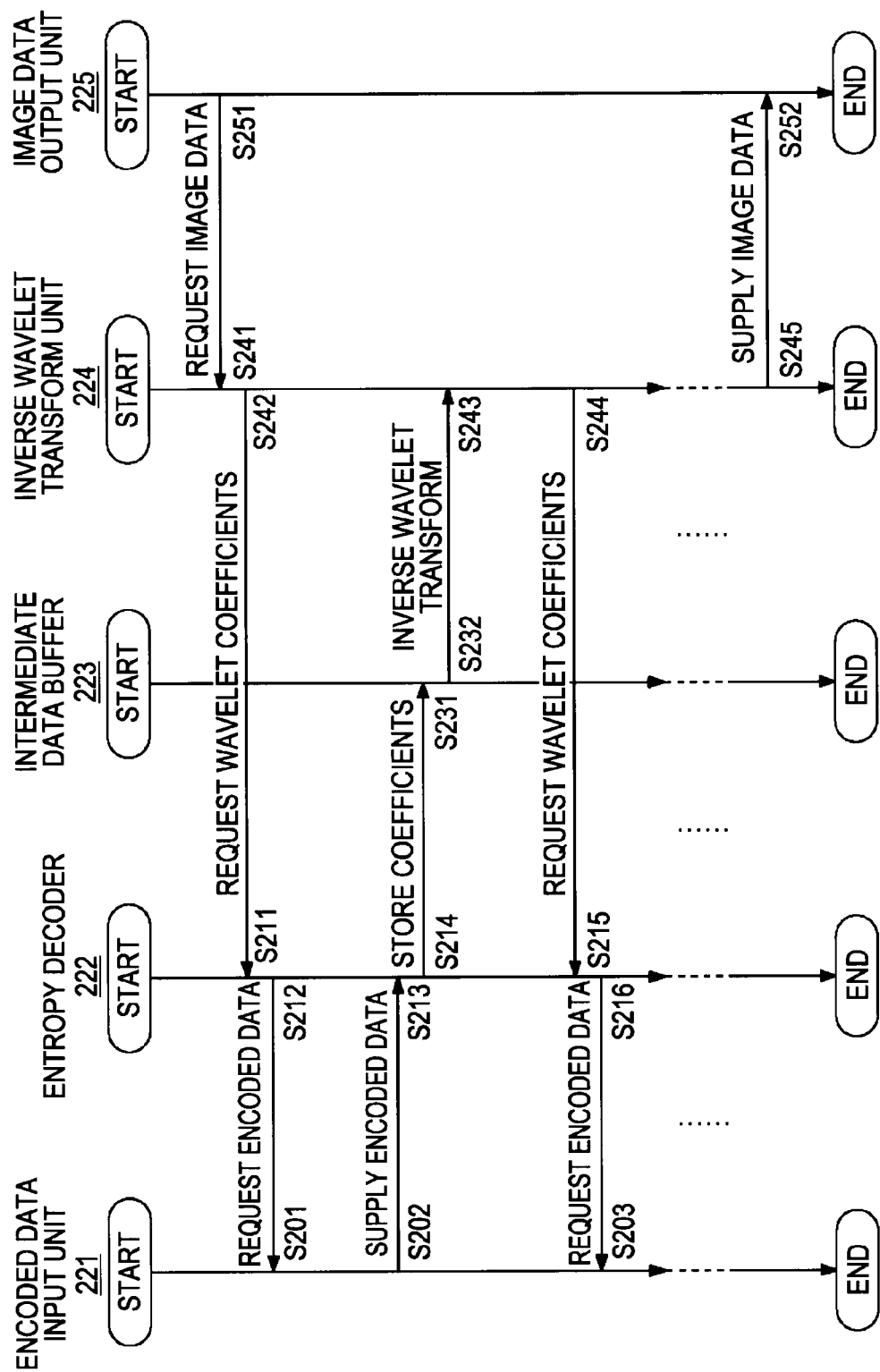
FIG. 15 is a flow chart illustrating an example of a manner in which data is transferred.

The flow of data among various parts in the above-described control process is described below with reference to a flow chart shown in FIG. 15.

First, in step S251, the image data output unit 225 requests the inverse wavelet transform unit 224 to provide image data specified by the control unit 211 to be output to the outside. If the inverse wavelet transform unit 224 receives, in step S241, the request, then in step S242, the inverse wavelet transform unit 224 requests the entropy decoder 222 to provide wavelet coefficient data which is specified by the control unit 211 and which corresponds to the image data.

If the entropy decoder 222 receives, in step S211, this request, then in step S212, the entropy decoder 222 requests the encoded data input unit 221 to provide encoded data. If the encoded data input unit 221 receives, in step S201, this request, the encoded data input unit 221 acquires the requested encoded data from the outside. In step S202, the encoded data input unit 221 supplies the acquired encoded data to the entropy decoder 222. If the entropy decoder 222 receives, in step S213, this encoded data, the entropy decoder 222 decodes the received encoded data into coefficient data. In step S214, the entropy decoder 222 supplies the obtained coefficient data to the intermediate data buffer 223. If the intermediate data buffer 223 receives, in step S231, the coefficient data from the entropy decoder 222, the intermediate data buffer 223 stores the received coefficient data in the L1 cache 131 and the L2 cache 132.

In step S243, the inverse wavelet transform unit 224 performs the inverse wavelet transform process while receiving the coefficient data from the intermediate data buffer 223. Correspondingly, in step S232, the intermediate data buffer 223 supplies the coefficient data to the inverse wavelet transform unit 224.

If all coefficients stored in the intermediate data buffer 223 have been processed, then, in step S244, the inverse wavelet transform unit 224 again requests the entropy decoder 222 to provide wavelet coefficients. If the entropy decoder 222 receives, in step S215, this request, then in step S216, the entropy decoder 222 requests the encoded data input unit 221 to provide encoded data. In step S203, the encoded data input unit 221 receives this request.

The process described above is performed repeatedly until baseband image data is produced. If the baseband image data is produced, then in step S245, the inverse wavelet transform unit 224 supplies the produced image data to the image data output unit 225. In step S252, the image data output unit 225 acquires the image data transmitted from the inverse wavelet transform unit 224.

Various data are transferred among various processing units under the control the of the control unit 211 in the above-described manner.

In the example described above, baseband image data is produced and output part by part in units of two lines. Alternatively, as shown in FIG. 16, baseband image data may be produced and output part by part in units of one line in synchronization with a horizontal synchronizing signal of a video signal.

Figure 16:
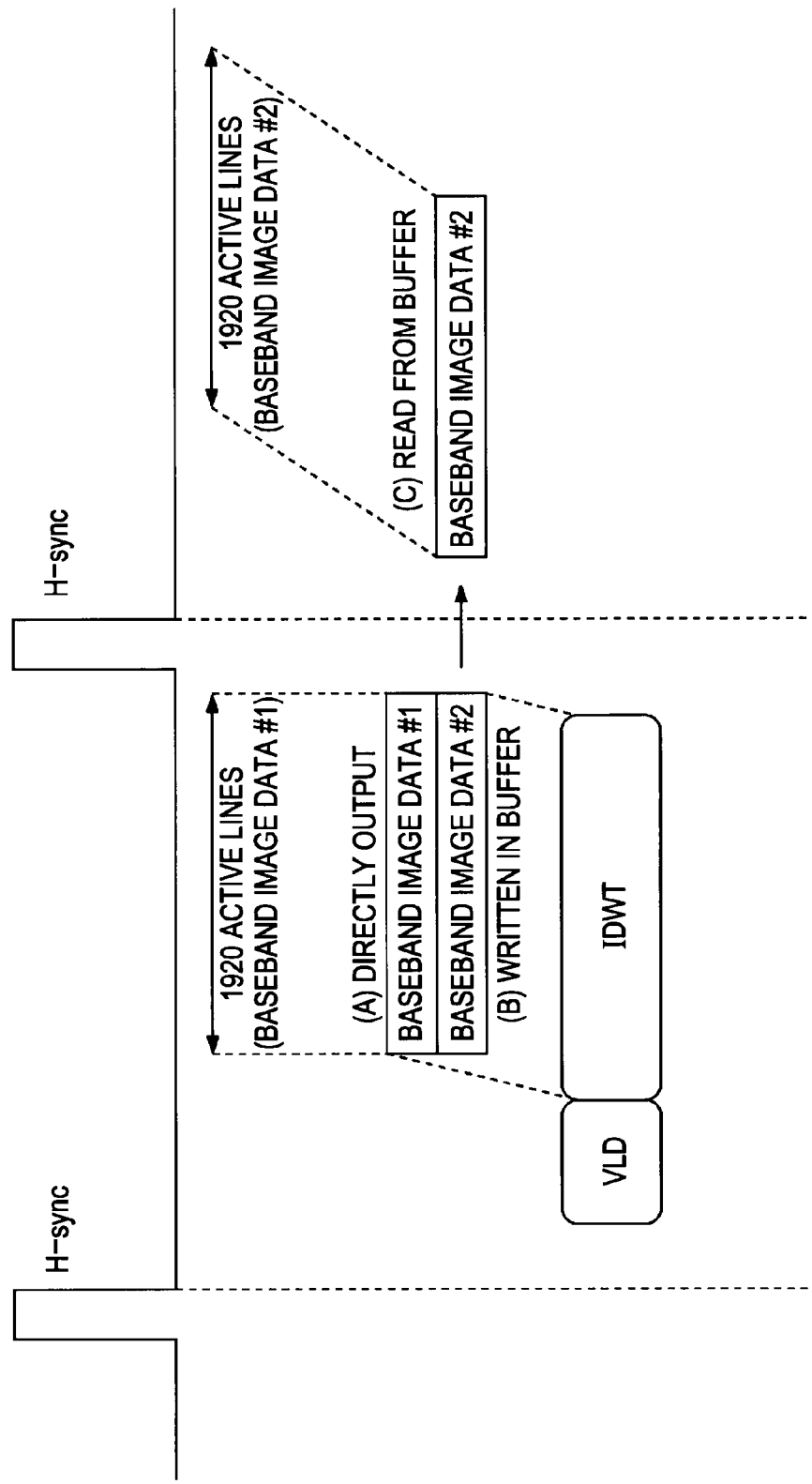
FIG. 16 is a schematic diagram illustrating an example of a processing timing.

In this case, as shown in FIG. 16, baseband image data (baseband image data #1 and baseband image data #2) are output such that one line is output at a time in response to each horizontal synchronizing pulse (H-Sync). However, as shown in FIG. 16, the baseband image data is produced in units of 2 lines (baseband image data #1 and baseband image data #2). That is, one of the two produced lines is directly output in response to an immediately following horizontal synchronizing pulse as represented in (A) in FIG. 16, while the other line is temporarily stored as represented in (B) in FIG. 16 and is read and output in response to a next horizontal synchronizing pulse as represented in (C) in FIG. 16.

Therefore, as shown in FIG. 16, it is necessary to complete the entropy decoding process (VLD) and the inverse wavelet transform process (IDWT) within a period between two adjacent horizontal synchronizing pulses. Because the inverse wavelet transform unit 224 (the decoder 200) is adapted to perform the synthesis filtering process in the order described above in order to reduce the intervals in which baseband image data is produced, it is easy to accomplish the realtime decoding process at the timing points as shown in FIG. 16.

That is, in this case, the inverse wavelet transform unit 224 is capable of performing the inverse wavelet transform on the input coefficient data in real time and outputting the resultant image data without buffering it so that the output image data is correctly displayed on a monitor. Note that the term "real time" is used herein to describe that the baseband image data is output line by line in synchronization with the horizontal synchronizing signal of the television signal or the like, and thus the term "real time" used herein does not imply that no delay occurs in the wavelet transform process.

Another example of a processing flow of the control process is described below with reference to a flow chart shown in FIG. 17. Note that also in this example, the control process is performed on a frame-by-frame basis. In this example, the entropy decoding process is performed on all encoded data in a precinct before the inverse wavelet transform process is performed.

Figure 12:
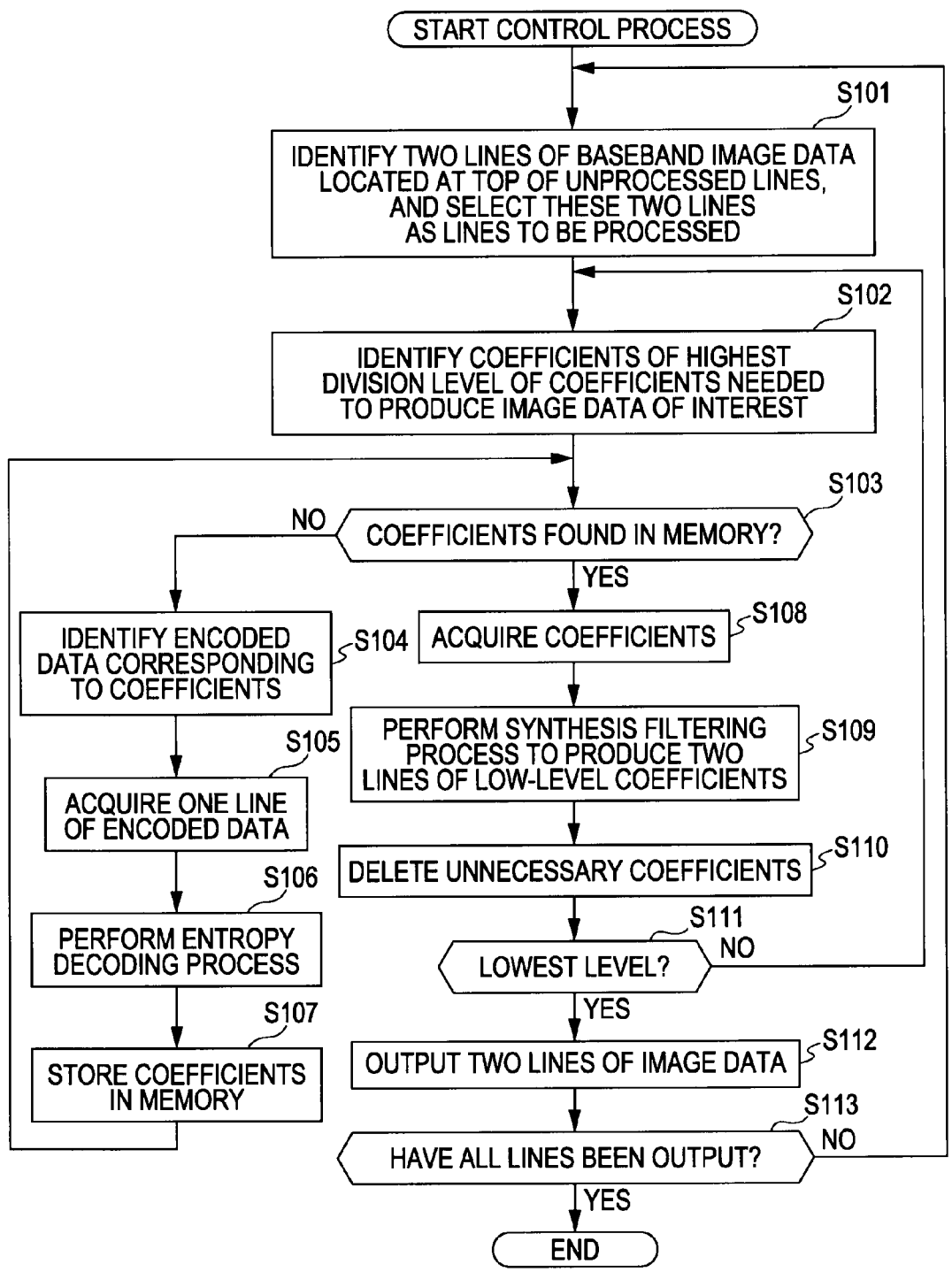
FIG. 12 is a flow chart illustrating an example of a control process.

Steps S301 to S304 are similar to steps S105 to S107 in the flow shown in FIG. 12. That is, if the control process is started, first in step S301, the control unit 211 controls the encoded data input unit 221 so as to acquire one line of the encoded data. In step S302, the control unit 211 controls the entropy decoder 222 so as to execute the entropy decoding process on the acquired encoded data. In step S303, the control unit 211 controls the intermediate data buffer 223 so as to store the coefficients obtained as a result of the entropy decoding process into the L1 cache 131 or the L2 cache 132. In step S304, the control unit 211 determines whether all encoded data in a precinct have been decoded. If it is determined that there is encoded data which has not yet been decoded, the control unit 211 returns the processing flow to step S301 to repeat the process from step S301. That is, the control unit 211 performs steps S301 to S304 repeatedly until all encoded data in the precinct have been decoded.

Steps S305 and S306 are similar to steps S101 and S102 in the flow shown in FIG. 12. That is, in step S305, the control unit 211 detects two lines of baseband image data located at the top of unprocessed lines and selects the detected two lines of baseband image data as data to be processed. In step S306, the control unit 211 determines coefficients of the highest division level of coefficients necessary in producing image data of interest.

Steps S307 to S309 are similar to steps S109 to S111 in the flow shown in FIG. 12. That is, in step S307, the control unit 211 controls the inverse wavelet transform unit 224 to perform the synthesis filtering process to produce 2 lines of coefficients of a division level lower by one, that is, the control unit 211 controls the inverse wavelet transform unit 224 to perform one execution of the lifting calculation. In step S308, the control unit 211 controls the intermediate data buffer 223 to delete unnecessary coefficients which will not be used in the synthesis filtering process from the coefficients stored in the L1 cache 131 or the L2 cache 132. In step S309, the control unit 211 determines whether the coefficients obtained as a result of the synthesis filtering process in step S307 are of the lowest level, that is, of baseband image data. In a case where it is determined that the obtained result of the synthesis filtering process is not baseband image data, the control unit 211 returns the process to step S305 to repeat the process from step S305. That is, steps S305 to S309 are performed repeatedly, that is, the lifting calculation of the synthesis filtering process is recursively repeated until baseband image data is obtained.

In the case where the determination in step S309 is that baseband image data is obtained as a result of the synthesis filtering process, the control unit 211 advances the process to step S310. Steps S301 and S302 are similar to steps S112 and S113 in the flow shown in FIG. 12. That is, in step S310, the control unit 211 controls the image data output unit 225 so as to output 2 lines of image data obtained via the synthesis filtering process. In step S311, the control unit 211 determines whether image data has been output for all lines of a frame. If it is determined that image data has not been output for all lines, the processing flow returns to step S305 to repeat the process from step S305. That is, the control unit 211 controls the inverse wavelet transform process to output baseband image data part by part in units of 2 lines sequentially starting from the top of the frame of the image.

In the case where it is determined in step S311 that all lines have been output, the control unit 211 ends the control process.

Figure 18:
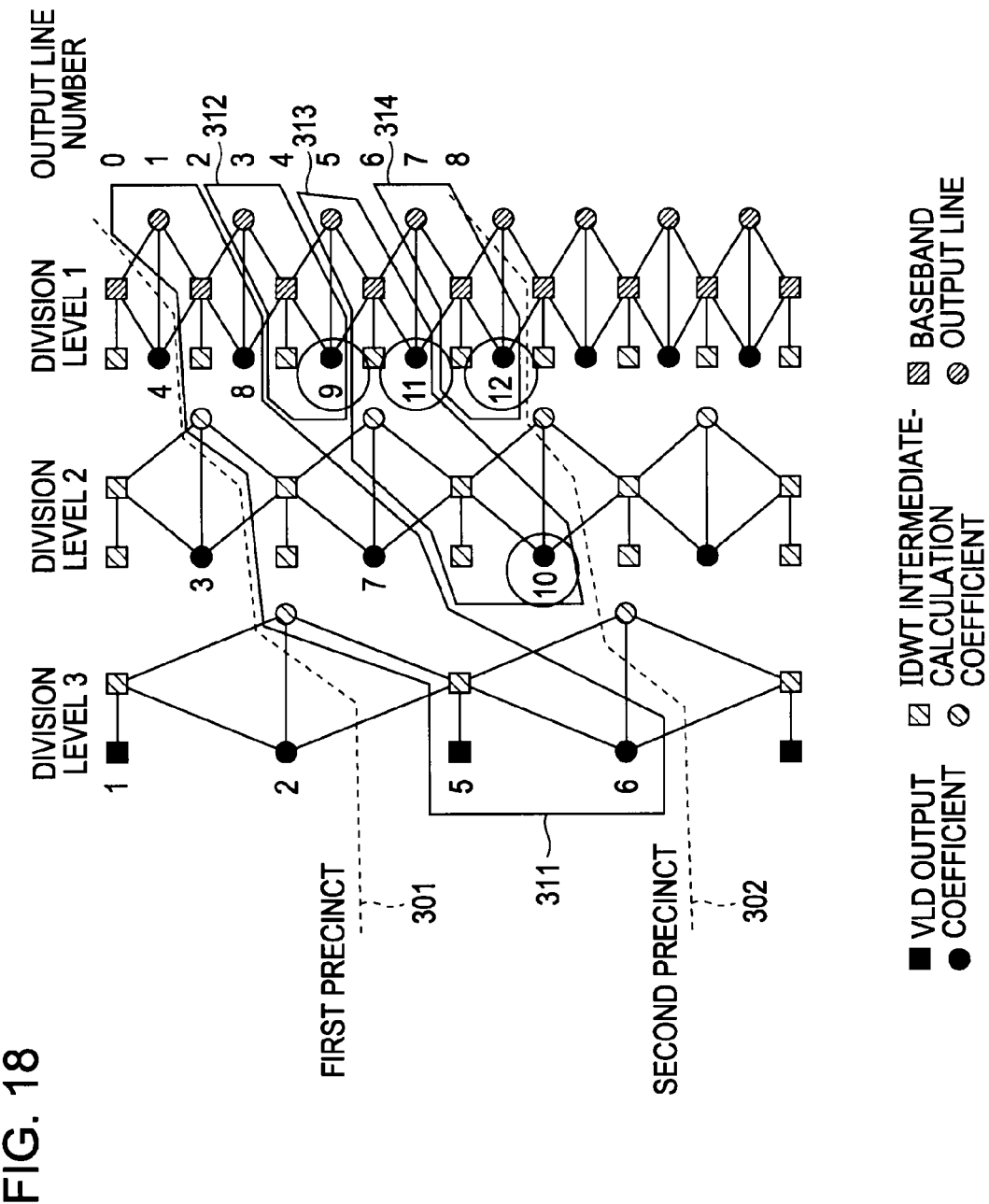
FIG. 18 is a diagram illustrating an example of a synthesis filtering process.
Figure 19:
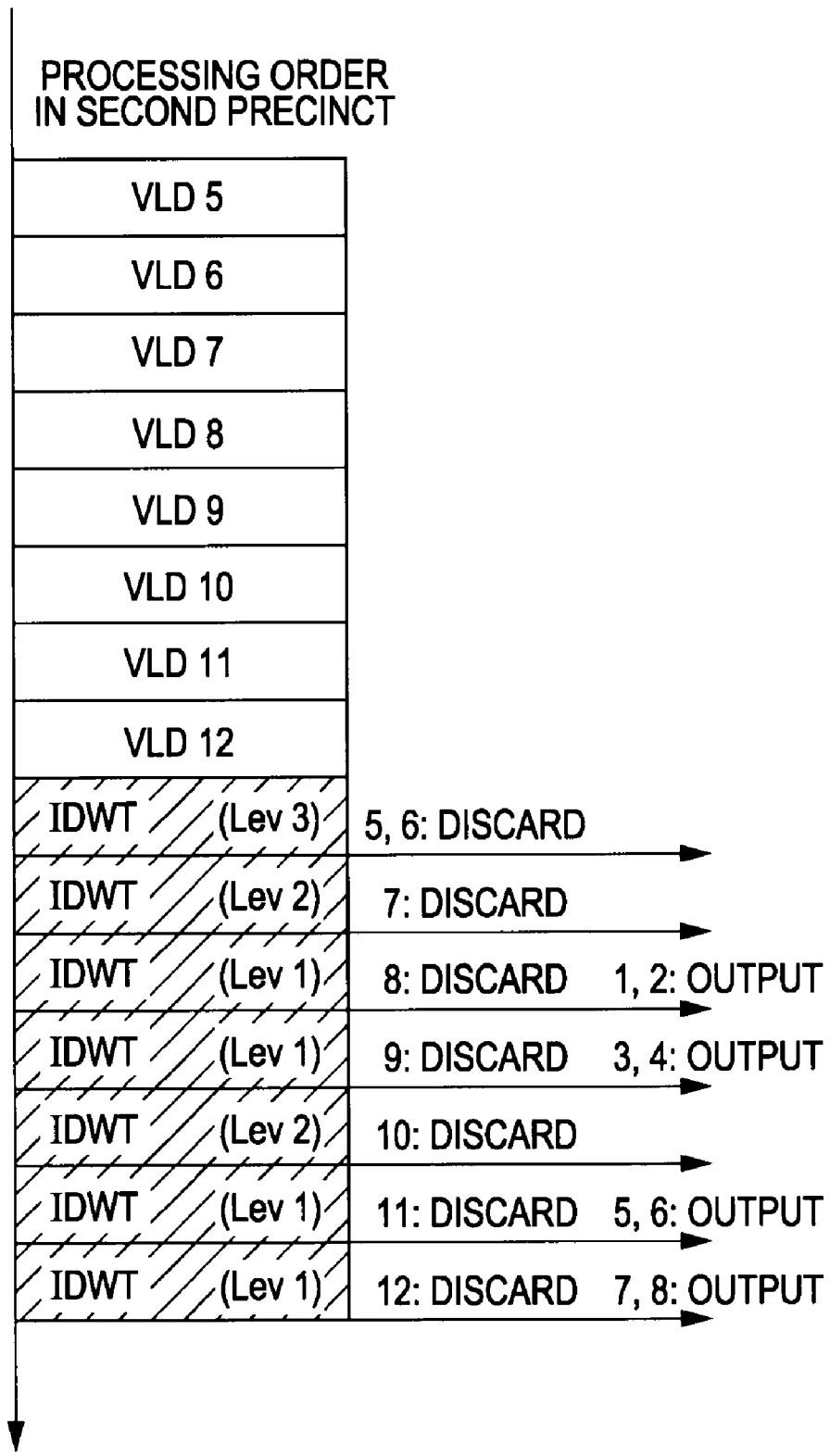
FIG. 19 is a schematic diagram illustrating an example of a processing flow in an entropy decoding process and an inverse wavelet transform process.

FIG. 18 illustrates a specific example of a procedure of the synthesis filtering process performed under the control of the control unit 211. The procedure of the synthesis filtering process is similar to that described above with reference to FIG. 13, except for the following. As shown in FIG. 19, the decoding process is performed for all encoded data (VLD 5 to VLD 12) in a precinct before the synthesis filtering process (IDWT) is performed. This leads to the following disadvantage. That is, before the baseband image data is produced for the line 0 and line 1, the control unit 211 stores, in the L1 cache 131 or the L2 cache 132, coefficient data including coefficient data decoded ninthly to twelfthly, which are unnecessary in the production of the baseband image data of the line 0 and the line 1.

Thus, compared with the procedure described above with reference to FIGS. 12 to 14, a greater amount of data is stored in the L1 cache 131 or the L2 cache 132. In other words, the control procedure described above with reference to FIGS. 12 to 14 needs a less amount of data stored in the L1 cache 131 or the L2 cache 132 than the control procedure described above with reference to FIGS. 17 to 19.

Furthermore, because all encoded data in a precinct are decoded before the lifting calculation of the synthesis filtering process is performed, a greater delay occurs, as shown in FIG. 19, in the timing of outputting a first part of baseband image data than in the procedure described above with reference to FIGS. 12 to 14. In other words, use of the procedure described above with reference to FIGS. 12 to 14 allows the decoder 200 to output a first part of baseband image data at an earlier time than in the case where the procedure described above with reference to FIGS. 17 to 19 is employed. That is, use of the procedure described above with reference to FIGS. 12 to 14 allows the decoder 200 to reduce the delay time caused by inverse wavelet transform process by a greater amount than in the case where the procedure described above with reference to FIGS. 17 to 19 is employed.

However, also in the procedure described above with reference to FIGS. 17 to 19, the lifting calculation is performed so that baseband image data is produced and output part by part in units of 2 lines as in the procedure described above with reference to FIGS. 12 to 14, the inverse wavelet transform unit 224 is capable of outputting a first part of the baseband image data at an earlier time than in the case where the lifting calculation is performed in a precinct in the order from the highest division level to the lowest division level.

In the procedure described above with reference to FIGS. 17 to 19, as in the procedure described above with reference to FIGS. 12 to 14, each time the lifting calculation is performed, the control unit 211 controls the intermediate data buffer 223 to delete (discard) coefficients unnecessary in the following lifting calculation processes from the L1 cache 131 and the L2 cache 132. This makes it possible for the decoder 200 to reduce the amount of data stored in the L1 cache 131 and the L2 cache 132.

Note that in the present control procedure, as can be seen from FIG. 19, the control unit 211 switches the process a less number of times than in the control process shown in FIG. 14, and thus the control procedure shown in FIG. 19 is easier than the control process shown in FIG. 14.

Figure 20:
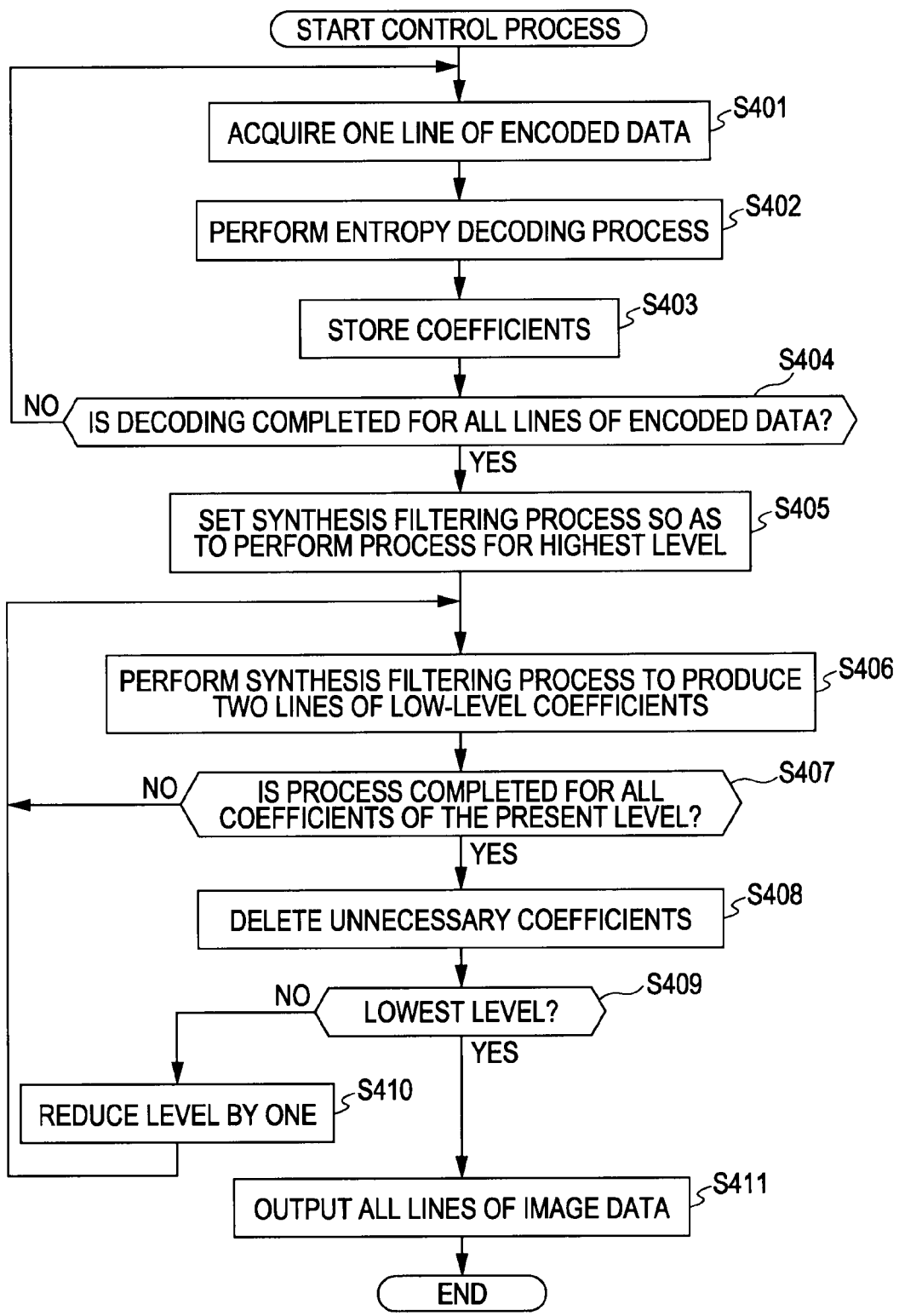
FIG. 20 is a flow chart illustrating an example of a control process.

A still another example of a processing flow of the control process is described below with reference to a flow chart shown in FIG. 20. Note that also in this example, the control process is performed on a frame-by-frame basis.

In this example, before the inverse wavelet transform process is performed, the entropy decoding process is performed on all encoded data in a precinct, and the lifting calculation is performed in the precinct in the order from the highest division level to the lowest division level.

Figure 17:
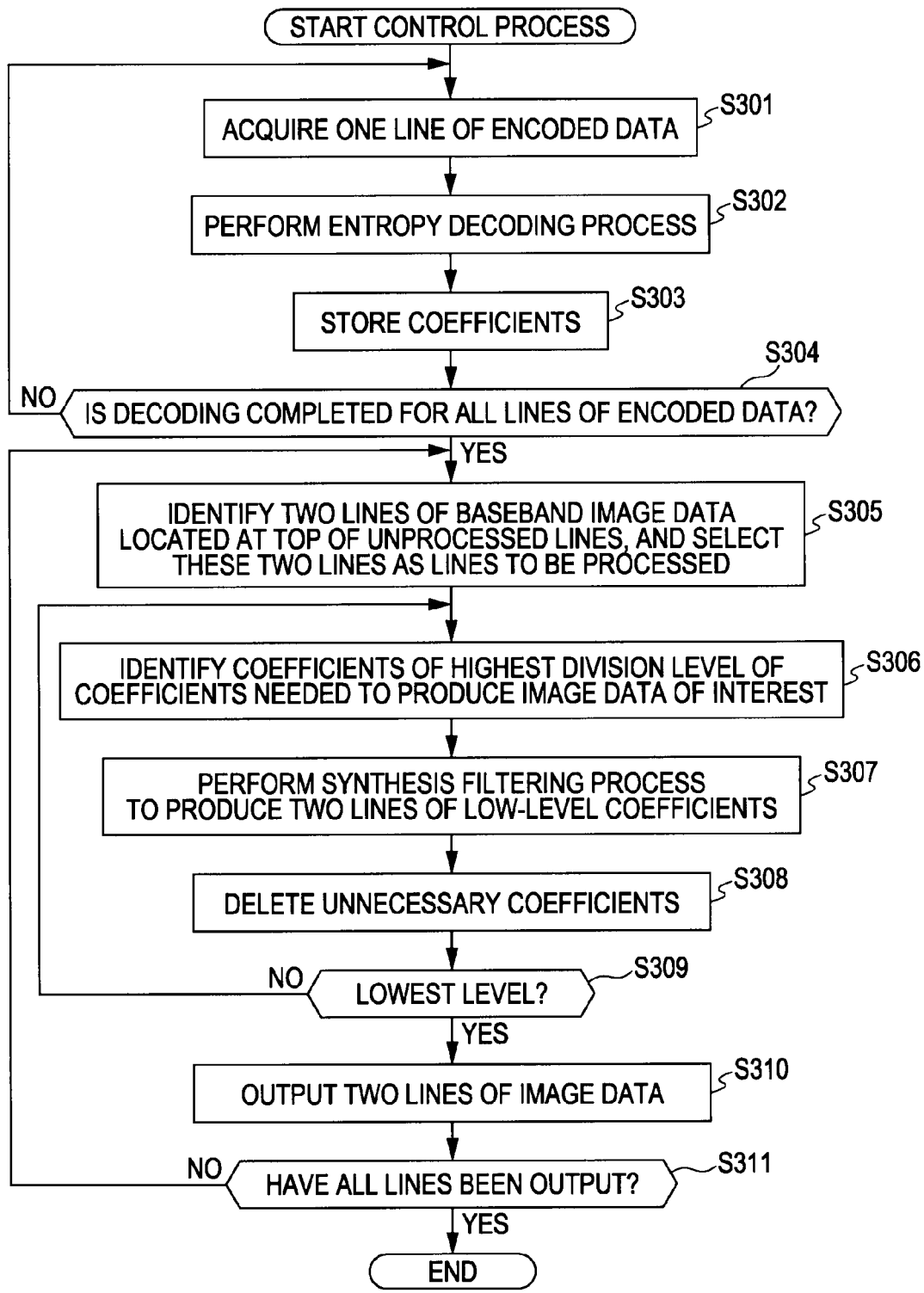
FIG. 17 is a flow chart illustrating an example of a control process.

Steps S401 to S403 are similar to steps S301 to S303 in the flow shown in FIG. 17. That is, if the control process is started, first in step S401, the control unit 211 controls the encoded data input unit 221 so as to acquire one line of the encoded data. In step S402, the control unit 211 controls the entropy decoder 222 so as to execute the entropy decoding process on the acquired encoded data. In step S403, controls the intermediate data buffer 223 so as to store the coefficients obtained as a result of the entropy decoding process into the L1 cache 131 or the L2 cache 132. In step S404, the control unit 211 determines whether all encoded data in a precinct have been decoded. If it is determined that there is encoded data which has not yet been decoded, the control unit 211 returns the processing flow to step S401 to repeat the process from step S401. That is, the control unit 211 performs steps S401 to S404 repeatedly until all encoded data in the precinct have been decoded.

In the case where it is determined in step S404 that all encoded data have been decoded, the process proceeds to step S405.

In step S405, the control unit 211 sets the synthesis filtering process so as to perform processing associated with the highest level. In step S406, the control unit 211 controls the inverse wavelet transform unit 224 to perform the synthesis filtering process to produce 2 lines of coefficients of a lower division level, that is, the control unit 211 controls the inverse wavelet transform unit 224 to perform one execution of the lifting calculation.

In step S407, the control unit 211 determines whether the process is completed for all coefficients in the present level. If it is determined that there is a coefficient in the present level which has not yet been processed, the control unit 211 returns the processing flow to step S406 to repeat the process from step S402. In the case where it is determined in step S407 that all coefficients in the level have been processed, the control unit 211 advances the process to step S408. In step S408, the control unit 211 controls the intermediate data buffer 223 to delete unnecessary coefficients which will not be used in the synthesis filtering process from the coefficients stored in the L1 cache 131 or the L2 cache 132.

In step S409, the control unit 211 determines whether the coefficients obtained as a result of the process in step S406 are of the lowest level, that is, whether baseband image data has been obtained. In a case where it is determined that the obtained result of the synthesis filtering process is not baseband image data, the control unit 211 advances the process to step S410. In step S410, the control unit 211 reduces the division level to be processed by one. The control unit 211 returns the processing flow to step S406 to repeat the process from step S406. That is, steps S406 to S410 are performed repeatedly until the process is completed for all division levels, that is, the lifting calculation of the synthesis filtering process is recursively repeated until the process is completed for all division levels.

If it is determined in step S409 that baseband image data is obtained as a result of the synthesis filtering process, the control unit 211 advances the processing flow to step S411 to output all lines of image data. If step S411 is completed, the control process is ended.

Figure 21:
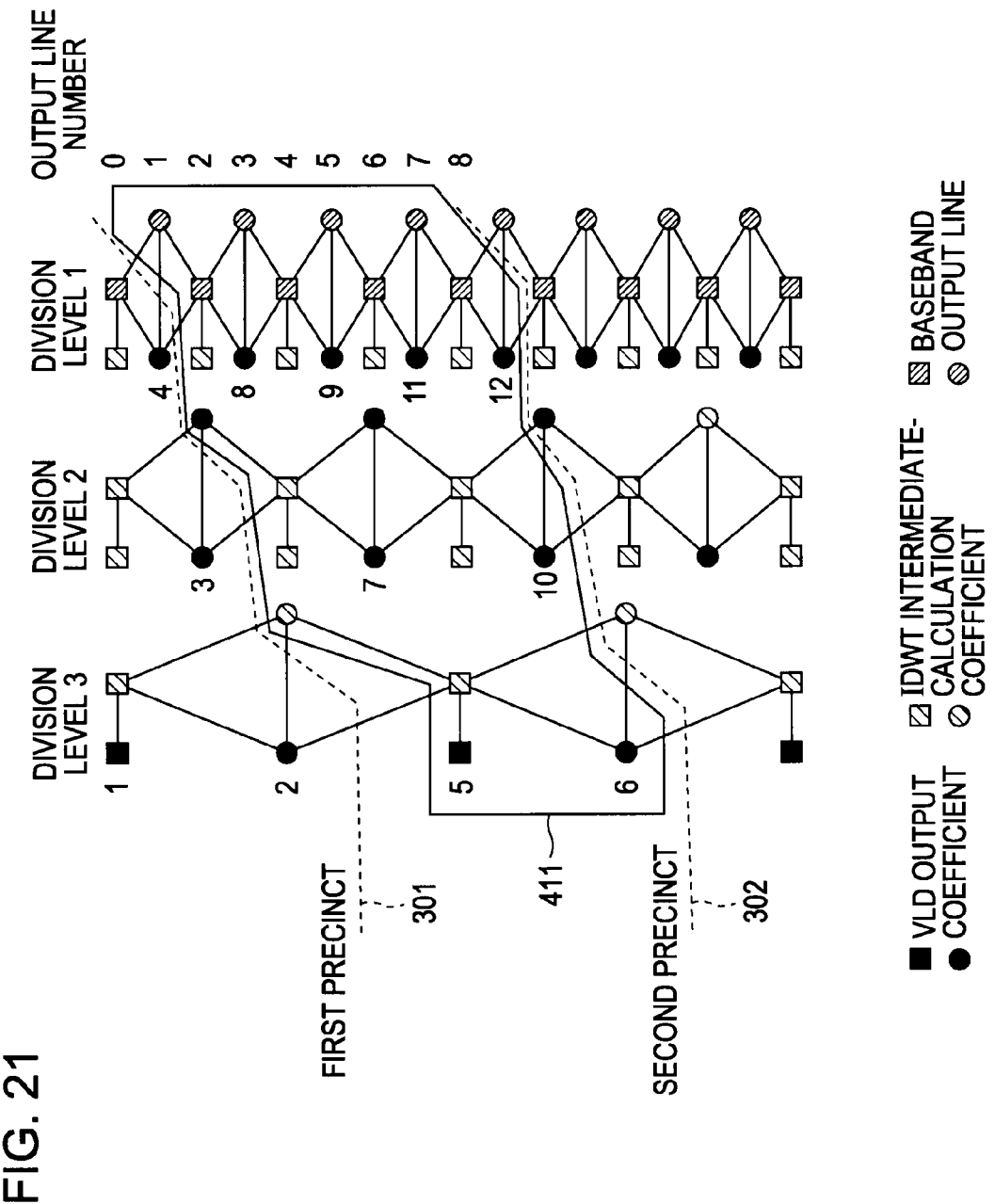
FIG. 21 is a diagram illustrating an example of a synthesis filtering process.
Figure 22:
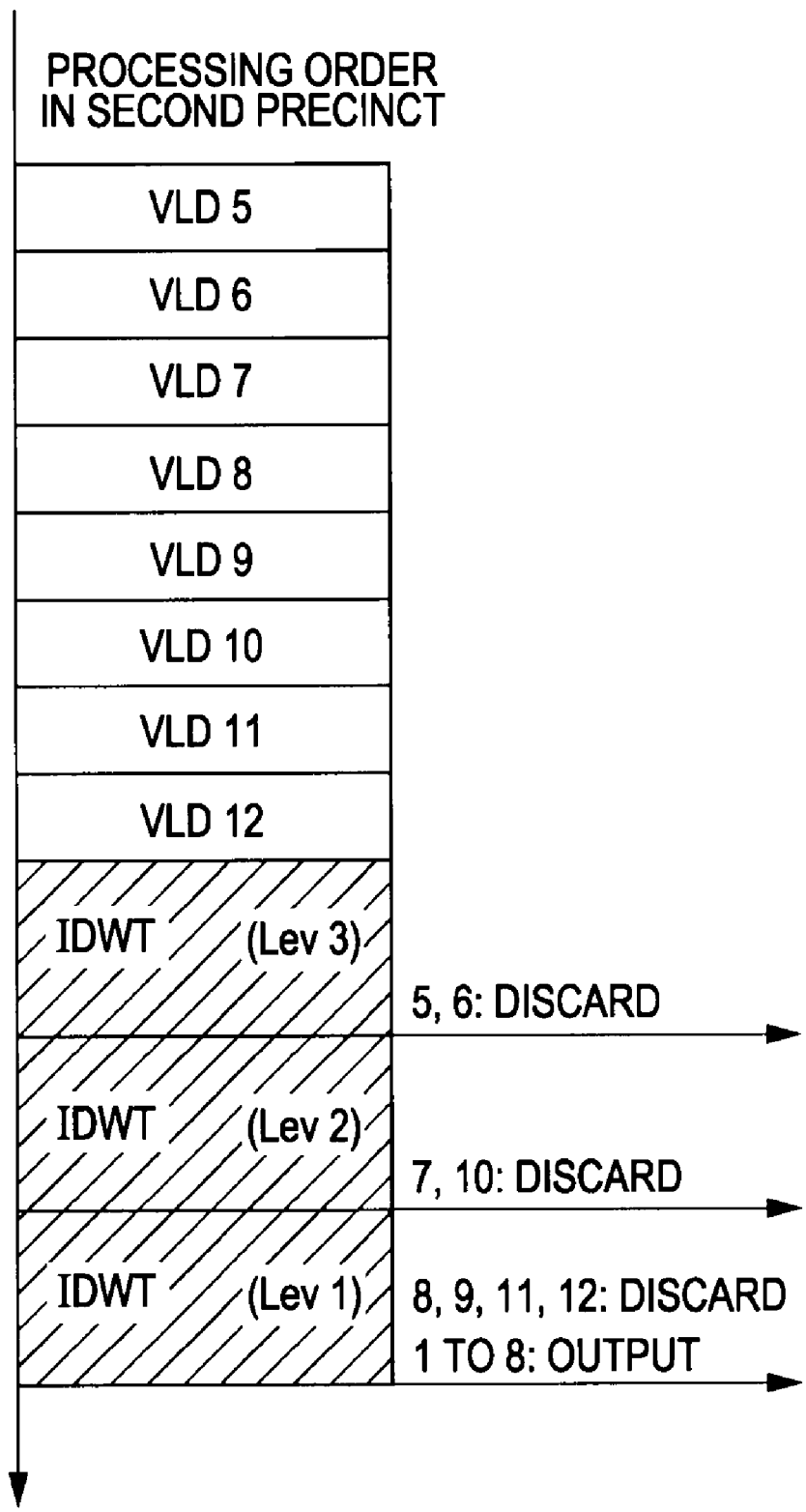
FIG. 22 is a schematic diagram illustrating an example of a processing flow in an entropy decoding process and an inverse wavelet transform process.

FIG. 21 illustrates a specific example of a procedure of the synthesis filtering process performed under the control of the control unit 211. In this example of the procedure, unlike the procedures described above, a whole precinct is regarded as one region 411, and the lifting calculation is performed for each division level. Therefore, as shown in FIG. 22, the decoder 200 does not output baseband image data until the entropy decoding process and the wavelet transform process are completed. This leads to a delay in timing of outputting a first part of baseband image compared with the procedures described above. Besides, a greater amount of data is stored in the L1 cache 131 or the L2 cache 132 than in the procedures described above.

Also in the present procedure as in the procedures described above, each time the lifting calculation is performed, the control unit 211 controls the intermediate data buffer 223 to delete (discard) coefficients unnecessary in the following lifting calculation processes from the L1 cache 131 and the L2 cache 132. This makes it possible for the decoder 200 to reduce the amount of data stored in the L1 cache 131 and the L2 cache 132.

Note that in the present control procedure, as can be seen from FIG. 22, the control unit 211 switches the process a less number of times than in the control process shown in FIG. 14 or that shown in FIG. 19, and thus the control procedure shown in FIG. 22 is easier than the control process shown in FIG. 14 or FIG. 19.

In the embodiments according to the present invention, as described above, the decoder 200 controls the entropy decoding process for each process associated with each encoded data, and controls the inverse wavelet transform process for each lifting calculation process. The decoder 200 properly performs scheduling so as to reduce the delay time caused by the decoding process and the inverse wavelet transform process. By properly performing the scheduling and deleting unnecessary coefficients, the decoder 200 is capable of achieving a great reduction in the amount of data kept during the decoding process and the inverse wavelet transform process, and storing the data in the L1 cache 131 and the L2 cache 132 capable of reading/writing data at a high speed. This makes it possible for the decoder 200 to achieve a further reduction in the delay caused by the decoding process and the inverse wavelet transform process.

In the embodiments described above, the entropy decoding process is controlled for each process associated with each encoded data, and the inverse wavelet transform process is controlled for each lifting calculation process. However, the present invention does not have a particular restriction on the processing unit, and the decoding process and the inverse wavelet transform process may be performed in arbitrary units. For example, the entropy decoding process may be performed for each of processing unit set to be smaller than each process associated with each encoded data thereby to achieve high precision in the control process. Conversely, a process associated with a plurality of encoded data may be employed as the processing unit thereby to achieve simplicity in the control process. Similarly, the processing unit of the inverse wavelet transform process may be set to be smaller than the lifting calculation process thereby to achieve high precision in the control process, or conversely, a process associated with a plurality of lifting calculation processes may be employed as the processing unit thereby to achieve simplicity in the control process.

In the embodiments described above, the lifting process is performed using the 5×3 filter. However, there is no particular restriction on the filter used in the filtering process. For example, a 9×7 filter may be employed.

The entropy decoding process and the inverse wavelet transform process may be performed by different processing modules.

The sequence of processing steps described above may be performed by hardware or software. The software program may be executed by any apparatus as long as the apparatus is capable of executing the software program. For example, the software program may be executed by a personal computer such as that shown in FIG. 23.

Figure 23:
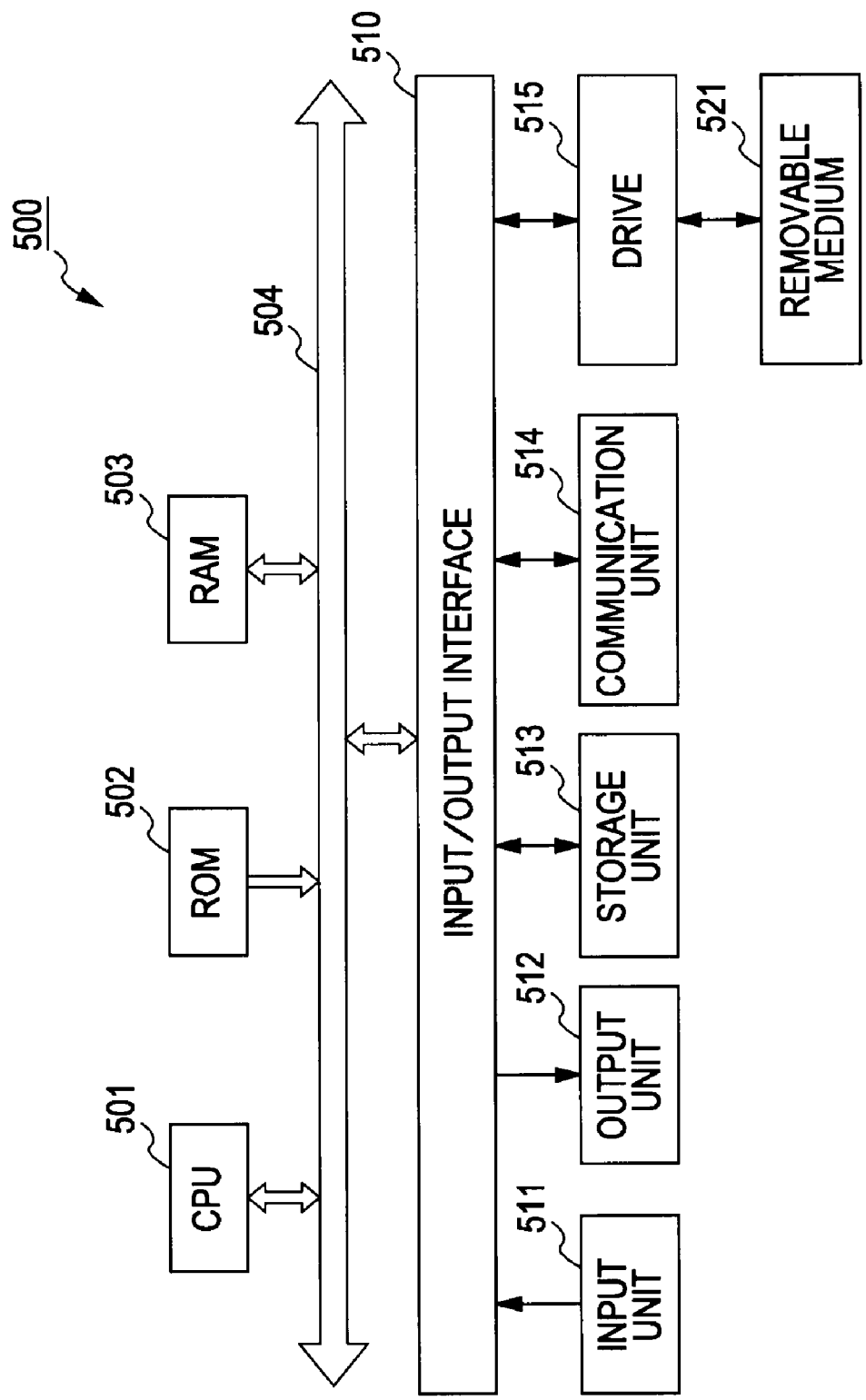
FIG. 23 is a block diagram illustrating an example of a configuration of a personal computer according to an example of the present invention.

As shown in FIG. 23, a CPU 501 of the personal computer 500 performs various processes in accordance with a program stored in a ROM (Read Only Memory) 502 or in accordance with a program loaded into a RAM (Random Access Memory) 503 from a storage unit 513. The RAM 503 is also used to store data used by the CPU 501 in the execution of various processes.

The CPU 501, the ROM 502, and the RAM 503 are connected to each other via a bus 504. The bus 504 is also connected to an input/output interface 510.

The input/output interface 510 is also connected to an input unit 511 including a keyboard, mouse, and the like, an output unit 512 including a display such as a CRT (Cathode Ray Tube) or an LCD (Liquid Crystal Display) and a speaker, a storage unit 513 such as a hard disk, and a communication unit 514 such as a modem. The communication unit 514 serves to perform communication via a networks such as the Internet.

Furthermore, the input/output interface 510 is also connected to a drive 515, as required. A removable storage medium 521 such as a magnetic disk, an optical disk, a magnetooptical disk, or a semiconductor memory is mounted on the drive 515 as required, and a computer program is read from the removable storage medium 521 and installed into the storage unit 513, as required.

When the processing sequence is executed by software, a program forming the software may be installed from a storage medium or via a network onto a computer.

An example of such a storage medium usable for the above purpose is a removable medium, such as the removable medium 521 shown in FIG. 23, on which a program is stored and which is supplied to a user separately from a computer. Specific examples include a magnetic disk (such as a floppy disk), an optical disk (such as a CD-ROM (Compact Disk-Read Only Memory) and a DVD (Digital Versatile Disk)), a magnetooptical disk (such as an MD (Mini-Disk, trademark)), and a semiconductor memory. A program may also be supplied to a user by preinstalling it on a built-in ROM 502 or a storage unit 513 such as a hard disk disposed in the computer.

In the present description, the steps described in the program stored in the storage medium may be performed either in time sequence in accordance with the order described in the program or in a parallel or separate fashion.

In the present description, the term "system" is used to describe the entirety of an apparatus including a plurality of sub-apparatuses.

Any single unit/module or the like used in the above-described embodiments may be divided into a plurality of units/modules or the like. Conversely, a plurality of units/modules or the like used in the above-described embodiments may be combined into a single unit/module or the like. Any unit/module or the like in the above-described embodiments may have an additional function. A function in any unit/module or the like in the above-described embodiments may be transferred in another unit/module as long as the total system can operate in substantially the same manner or can provide substantially the same total functions.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   synthesis filtering process means for performing a synthesis filtering process on image data, the image data having been subjected to hierarchical executions of an analysis filtering process, each execution of the analysis filtering process having caused frequency components of the image data to be divided into high-frequency components and low-frequency components, the hierarchical executions of the analysis filtering process having caused the image data to be divided into a plurality of frequency bands, the synthesis filtering process involving synthesizing frequency components of frequency bands in each division level by performing a lifting calculation; and
   control means for controlling an execution of the synthesis filtering process performed by the synthesis filtering process means for each lifting calculation such that the lifting calculations are performed in an order that allows image data to be produced part by part, each part including a plurality of lines, the control means controlling the execution by determining frequency components of a next highest division level to produce the part in response to a determination that the frequency components synthesized by performing the lifting calculation are not of baseband image data.

2. The information processing apparatus according to claim 1, wherein each part includes two lines.

3. The information processing apparatus according to claim 1, wherein, in a production of each part of the image data, only lifting calculations necessary to produce the part of image data are performed.

4. The information processing apparatus according to claim 1, wherein each time a lifting calculation is performed, the control means deletes frequency components, which will not be used in a following lifting calculations, from a storage unit for storing frequency components used in the synthesis filtering process.

5. The information processing apparatus according to claim 1, further comprising:
   decoding means for decoding encoded data of each frequency component of the image data, wherein the synthesis filtering process means performs the synthesis filtering process on frequency components obtained from the encoded data via the decoding performed by the decoding means, and the control means controls an execution of the decoding process performed by the decoding means, the decoding process being divided into a plurality of processing steps, the control means controlling the execution of the decoding process for each processing step.

6. The information processing apparatus according to claim 5, wherein the control means employs a process associated with each encoded data as one of the processing steps, and controls the execution of the decoding process for each encoded data.

7. The information processing apparatus according to claim 6, wherein, in a production of each part of the image data, the control means controls the decoding means to perform the decoding process for only encoded data necessary in producing the part of the image data.

8. The information processing apparatus according to claim 7, wherein the control means controls the synthesis filtering process means to perform only lifting calculations on the obtained frequency components necessary to produce the part of the image data.

9. The information processing apparatus according to claim 6, wherein the control means controls the decoding means such that the decoding process is performed for all encoded data belonging to a particular set of encoded data, and, after a completion of the decoding process for the particular set of encoded data, the control means controls the synthesis filtering process means such that the lifting calculation is performed for frequency components obtained as a result of the decoding process.

10. An information processing method, comprising:
    performing a synthesis filtering process on image data, the image data having been subjected to hierarchical executions of an analysis filtering process, each execution of the analysis filtering process having caused frequency components of the image data to be divided into high-frequency components and low-frequency components, the hierarchical executions of the analysis filtering process having caused the image data to be divided into a plurality of frequency bands, the synthesis filtering process involving synthesizing frequency components of frequency bands in each division level by performing a lifting calculation,
    an execution of the synthesis filtering process being controlled for each lifting calculation such that the lifting calculations are performed in an order that allows image data to be produced part by part, each part including a plurality of lines, the execution controlled by a determination of frequency components of a next highest division level to produce the part in response to a determination that the frequency components synthesized by performing the lifting calculation are not of baseband image data.

11. An information processing apparatus, comprising:
    a synthesis filtering process unit adapted to perform a synthesis filtering process on image data, the image data having been subjected to hierarchical executions of an analysis filtering process, each execution of the analysis filtering process having caused frequency components of the image data to be divided into high-frequency components and low-frequency components, the hierarchical executions of the analysis filtering process having caused the image data to be divided into a plurality of frequency bands, the synthesis filtering process involving synthesizing frequency components of frequency bands in each division level by performing a lifting calculation; and a control unit adapted to control an execution of the synthesis filtering process performed by the synthesis filtering process unit for each lifting calculation such that the lifting calculations are performed in an order that allows image data to be produced part by part, each part including a plurality of lines, the control unit further adapted to control the execution by determining frequency components of a next highest division level to produce the part in response to a determination that the frequency components synthesized by performing the lifting calculation are not of baseband image data.

* * * * *